(12) United States Patent
Miniskar et al.

(10) Patent No.: US 11,593,644 B2
(45) Date of Patent: Feb. 28, 2023

(54) METHOD AND APPARATUS FOR DETERMINING MEMORY REQUIREMENT IN A NETWORK

(71) Applicant: SAMSUNG ELECTRONICS CO., LTD., Suwon-si (KR)

(72) Inventors: Narasinga Rao Miniskar, Bangalore (IN); Sirish Kumar Pasupuleti, Bangalore (IN); Raj Narayana Gadde, Bangalore (IN); Ashok Vishnoi, Bangalore (IN); Vasanthakumar Rajagopal, Bangalore (IN); Chandra Kumar Ramasamy, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 434 days.

(21) Appl. No.: 16/637,638

(22) PCT Filed: Aug. 8, 2018

(86) PCT No.: PCT/KR2018/009055
§ 371 (c)(1),
(2) Date: Feb. 7, 2020

(87) PCT Pub. No.: WO2019/031858
PCT Pub. Date: Feb. 14, 2019

(65) Prior Publication Data
US 2020/0257972 A1    Aug. 13, 2020

(30) Foreign Application Priority Data

Aug. 8, 2017 (IN) .............................. 201741028087
Aug. 6, 2018 (IN) .............................. 201741028087

(51) Int. Cl.
*G06N 3/08* (2006.01)
*G06F 12/02* (2006.01)
*G06N 5/04* (2023.01)

(52) U.S. Cl.
CPC ............... *G06N 3/08* (2013.01); *G06F 12/02* (2013.01); *G06N 5/04* (2013.01)

(58) Field of Classification Search
CPC G06N 3/04; G06N 3/063; G06N 5/04; G06N 3/08; G06N 5/003; G06F 12/02
See application file for complete search history.

(56) References Cited

U.S. PATENT DOCUMENTS 5,778,245 A      7/1998  Papworth et al.
10,452,971 B2 * 10/2019  Chung ..................... G06N 3/04
(Continued)

FOREIGN PATENT DOCUMENTS

EP       3396546 A1 * 10/2018  ......... G06F 9/45533

OTHER PUBLICATIONS

R. Sakamoto et al., "The Design and Implementation of Scalable Deep Neural Network Accelerator Cores," 2017 IEEE 11th International Symposium on Embedded Multicore/Many-core Systems-on-Chip (MCSoC), 2017, pp. 13-20.*
(Continued)

*Primary Examiner* — Pierre Michel Bataille
(74) *Attorney, Agent, or Firm* — Sughrue Mion, PLLC

(57) ABSTRACT

The present disclosure disclose method and apparatus for determining memory requirement for processing a DNN model on a device, a method includes receiving a DNN model for an input, wherein the DNN model includes a plurality of processing layers. The method includes generating a network graph of the DNN model. The method includes creating a colored network graph of the DNN model based on the identified execution order of the plural- (Continued)

ity of processing layers. The colored network graph indicates assignment of at least one memory buffer for storing at least one output of at least one processing layer. The method includes determining at least one buffer reuse overlap possibility across the plurality of processing layers. Based on the determined at least one buffer reuse overlap possibility, the method includes determining and assigning the memory required for processing the DNN model.

16 Claims, 22 Drawing Sheets

(56) References Cited

U.S. PATENT DOCUMENTS

| | | | |
|---|---|---|---|
| 11,442,779 B2* | 9/2022 | Zhao | G06N 3/10 |
| 2010/0023708 A1 | 1/2010 | Feng et al. | |
| 2016/0379109 A1 | 12/2016 | Chung et al. | |
| 2016/0379115 A1 | 12/2016 | Burger et al. | |
| 2018/0307972 A1* | 10/2018 | Feng | G06F 12/1009 |
| 2018/0308208 A1* | 10/2018 | Surti | G06N 3/0454 |
| 2019/0205736 A1* | 7/2019 | Bleiweiss | G06N 3/0454 |
| 2019/0220316 A1* | 7/2019 | Zhao | G06N 3/084 |
| 2019/0303025 A1* | 10/2019 | Sekiyama | G06F 3/0631 |
| 2019/0318229 A1* | 10/2019 | Che | G06N 3/063 |

OTHER PUBLICATIONS

K. Peng, S. Fu, Y. Liu and W. Hsu, "Adaptive runtime exploiting sparsity in tensor of deep learning neural network on heterogeneous systems," 2017 International Conference on Embedded Computer Systems: Architectures, Modeling, and Simulation (SAMOS), 2017, pp. 105-112.*

N. R. Miniskar, S. K. Pasupuleti, V. Rajagopal, A. Vishnoi, C. K. Ramasamy and R. N. Gadde, "Optimal SDRAM Buffer Allocator for Efficient Reuse of Layer IO in CNNs Inference Framework," 2018 IEEE International Symposium on Circuits and Systems (ISCAS), 2018, pp. 1-5.*

M. Rhu, N. Gimelshein, J. Clemons, A. Zulfiqar and S. W. Keckler, "vDNN: Virtualized deep neural networks for scalable, memory-efficient neural network design," 2016 49th Annual IEEE/ACM International Symposium on Microarchitecture (MICRO), 2016, pp. 1-13.*

Sekiyama, Taro • Imamichi, Takashi • Imai, Haruki • Raymond, Rudy, Profile-Guided Memory Optimization For Deep Neural Networks, arxiv.org, Apr. 26, 2018.*

Communication dated Jun. 25, 2020 by the European patent Office in counterpart European Patent Application No. 18843620.8.

Chen, Tianqi et al., "Training Deep Nets with Sublinear Memory Coat", arxiv.org, Cornell University Library, Apr. 21, 2016, XP080696924. (12 pages total).

Huang, Eric, "Optimal Rectangle Packing", University of California, Los Angeles, CA, Dec. 31, 2010, pp. 1-174, XP055704347.

Gergov, Jordan, "Algorithms for Compile-Time Memory Optimization", Discrete Algorithms, Society for Industrial and Applied Mathematics, Jan. 1, 1999, pp. 907-908, XP058375204.

Minsoo Rhu et al., "vDNN: Virtualized Deep Neural Networks for Scalable, Memory—Efficient Neural Network Design" Jul. 28, 2016, retrieved from: https://arxiv.org/pdf/1602.08124.pdf, pp. 1-4, (4 pages total).

International Search Report (PCT/ISA/210) dated Nov. 16, 2018 issued by the International Searching Authority in International Application No. PCT/KR2018/009055.

Written Opinion (PCT/ISA/237) dated Nov. 16, 2018 issued by the International Searching Authority in International Application No. PCT/KR2018/009055.

* cited by examiner

| Network | Total Layer IO (MB) | |
|---|---|---|
| | Batch Size 1 | Batch Size 10 |
| AlexNet | 7.90 | 79.00 |
| VGG16 | 109.80 | 1098.00 |
| GoogLeNet | 38.30 | 383.00 |
| ResNet-50 | 178.00 | 1780.00 |
| SqueezeNet | 47.60 | 476.00 |
| MobileNet | 77.50 | 775.00 |
| Inception-ResNet-v2 | 450.52 | 4505.20 |
| VisualSearch | 272.80 | 2728.00 |
| SSD-MobileNet | 71.50 | 715.00 |
| Style Transfer | 37.70 | 377.00 |
| VizInsight | 14.56 | 145.60 |
| Bokeh | 46.49 | 464.88 |
| 3D Avatar | 79.00 | 790.00 |

FIG.4A

| Network | DNN Inference Performance (ms) |
|---|---|
| AlexNet | 55 |
| VGG16 | 787 |
| GoogLeNet | 92 |
| ResNet-50 | 280 |
| SqueezeNet | 72 |
| MobileNet | 77 |
| VisualSearch | 791 |
| Style Transfer | 71 |

| Network | Total Layer IO (MB) | |
|---|---|---|
| | Batch Size 1 | Batch Size 10 |
| AlexNet | 2.20 | 22.00 |
| VGG16 | 24.70 | 247.00 |
| GoogLeNet | 6.10 | 61.00 |
| ResNet-50 | 9.10 | 91.00 |
| SqueezeNet | 9.00 | 90.00 |
| MobileNet | 6.20 | 62.00 |
| Inception-ResNet-v2 | 11.10 | 111.00 |
| VisualSearch | 10.50 | 105.00 |
| SSD-MobileNet | 11.10 | 111.00 |
| Style Transfer | 4.50 | 45.00 |
| Bokeh | 12.00 | 120.00 |
| 3D Avatar | 8.00 | 80.00 |

| Network | DNN Inference Performance |
|---|---|
| AlexNet | 50 (9%) |
| VGG16 | 743 (5%) |
| GoogLeNet | 85 (7%) |
| ResNet-50 | 236 (15%) |
| SqueezeNet | 56 (22%) |
| MobileNet | 58 (24%) |
| VisualSearch | 633 (19%) |
| Style Transfer | 83 (11%) |

METHOD AND APPARATUS FOR DETERMINING MEMORY REQUIREMENT IN A NETWORK

CROSS-REFERENCE TO RELATED APPLICATION(S)

This application is a National Phase Entry of PCT International Application No. PCT/KR2018/009055, which was filed on Aug. 8, 2018 and claims priority to Indian Provisional Patent Application No. 201741028087 filed on Aug. 8, 2017 and Indian Complete Patent Application No. 201741028087 filed on Aug. 6, 2018 in the Indian Intellectual Property Office, the contents of which are incorporated herein by reference.

BACKGROUND

1. Field

The present disclosure relates to the field of neural network applications on an embedded device. And more particularly, the present disclosure related to determining and allocating memory required for processing a deep neural network (DNN) model on the embedded device.

2. Description of the Related Art

Currently, deep neural networks (DNNs) have become closer to human accuracy in computer vision tasks (object detection/classification/segmentation), speech, natural language processing (NLP) and so on. However, increased accuracy has come at the cost of increased memory bandwidth and computational requirements. The increased memory bandwidth and computational requirements of the DNNs make it hard to deploy the DNNs on low power embedded devices.

FIG. 1 is an example diagram illustrating an inference stage of a conventional DNN. The conventional DNN includes at least two stages/phases, namely an inference/processing phase and training phase. The training phase can generate a DNN model using computational resources. The inference phase infers a label from a given input using the DNN model generated from the training phase. The trained DNN model can include a plurality of processing layers that can be executed for inferring the input.

As illustrated in FIG. 1, the conventional DNN takes an image having three feature maps/channels (RGB). The feature map is a two-dimensional image having characteristics of the input image such as color, edges and so on. The three feature maps of the input image need to be stored in a dynamic random access memory (DRAM) of the embedded device (for example, allocating 618 KB of memory for storing three feature maps). The conventional DNN predicts the input image by processing the trained DNN model. Processing of the trained DNN model includes applying the plurality of processing layers on the input image for generating multiple feature maps, reducing size of the input image and generating the prediction/inference of the input image. For example, a layer 1 of the DNN model outputs 96 feature maps. The outputted 96 feature maps can be intermediate feature maps which need to be stored in the DRAM (allocating 19 MB of memory for storage of 96 feature maps). A layer-2 of the DNN model outputs 256 feature maps (intermediate feature maps) which need to be stored in the DRAM (allocating 746 MB of memory for storage of 256 feature maps). Thus, in the inference phase of the conventional DNN, the intermediate feature maps (outputs of each layer) need to be stored in the DRAM. However, in the inference phase, next successive layers can not consume the stored intermediate feature maps. Thereby, resulting in increased memory bandwidth and computational requirements.

FIGS. 2a and 2b are example diagrams illustrating conventional buffer allocation methods for processing sequential and complex DNN models on the embedded device. A sequential DNN model relies on a single input and single output topology, which depicts sequential dependency of the processing layers of the sequential DNN model. A network structure of the sequential DNN model can be depicted as a network graph as illustrated in FIG. 2a. The network graph includes nodes and edges. The nodes depict the processing layers of the sequential DNN model and the layers depict the data flow (feature map data flow) between the processing layers. For example, the network graph includes four nodes depicting four layers (Layer-1, layer-2, layer-3 and layer-4) of the sequential DNN model and five edges (E1, E2, E3, E4 and E5) depicting the data flow between the five layers. Further, each processing layer requires its own independent buffers. Thus, in the network graph, each edge associated with each layer is assigned with a unique memory buffer (region of memory/synchronous dynamic random access memory (SDRAM)) corresponding to a unique memory location. For example, a memory buffer B1 of 0.6 MB can be assigned to the edge E1, memory buffers B1, B2 and B3 of 1.1 MB can be assigned to the edges E2, E3 and E4 respectively and a memory buffer B5 of 0.2 MB can be assigned to the edge E5. A total memory required can be equivalent to the sum of all the buffers, which can be equal to 4.1 MB. This can lead to a huge requirement of SDRAM memory footprint for the inference stage of the sequential DNN.

A complex DNN model relies on complex topologies, which depict single input and multi output, multi input and single output, multi-input and multi-output and so on. A network graph of the complex DNN model is illustrated in FIG. 2b. For example, the network graph of the complex DNN model includes five nodes depicting five processing layers (Layer1, 2, 3, 4 and 5) and six edges depicting the data flow between the five processing layers. Further, memory buffers B1, B4, B5 and B6 of 3.1 Mb can be assigned to the edges E1, E4, E5 and E6 respectively and memory buffers B2 and B3 of 0.8 Mb can be assigned to the edges E2 and E3 respectively. A total memory requirement for executing the six layers of the complex DNN can be equal to 14 MB. Thus, resulting in an increased memory requirement for executing the processing layers of the complex DNN during the inference phase.

FIG. 3 is an example diagram illustrating memory allocation methods associated with conventional DNN inference frameworks for processing DNN models on the embedded device. Conventional DNN inference frameworks such as Caffe, Tensorflow and Qualcomm snapdragon neural processing engine (SNPE) use non-overlap buffers, wherein a unique buffer can be assigned for each processing layer in order to process the DNN models (Caffe, Tensorflow and Qualcomm SNPE DNN models). In these conventional frameworks, reuse of the memory buffers can not be possible across the processing layers of the DNN models. Thus, total buffer requirement can be equal to sum of all the memory buffers.

Further, conventional DNN inference frameworks such as Tensorflow Lite, Tencent NCNN, and so on use system malloc for allocation of layer JO and free the layer JO after the execution of each processing layer. However, memory allocation using system malloc leads to sub-optimal results because of malloc overheads and fragmentation. Moreover, system malloc doesn't have a knowledge on liveness of DNN buffers though the network graph is available. Also, in these conventional frameworks, non-availability of memory for dynamic buffer request can lead to segmentation fault.

Conventional DNN inference frameworks such as MXNet inference framework exploit the reuse of the memory buffers across the processing layers of the MXNet DNN model since it uses a register allocation method used in complier. In the MXNet inference framework, the memory buffer serves as a register. However, in the MXNet framework, a size of the buffer is not considered.

FIG. 4a is an example table illustrating memory buffer requirement for processing the DNN models using the conventional DNN inference frameworks. FIG. 4a illustrates the memory buffer required for processing the DNN models using the conventional DNN inference frameworks such as AlexNet, VGG16, GoogLeNet and so on. A maximum buffer requirement for processing the DNN model using the conventional DNN inference frameworks can be 4.5 GB.

FIGS. 4b and 4c illustrate performance of the conventional DNN inference frameworks with respect to cache utilization. In the conventional DNN inference frameworks, when the processing layer writes feature maps, it can be a miss in Level-2/Level-3 cache as the processing layers use completely different buffers, which can lead to more compulsory cache misses. Further, the cache misses can increase the overall execution time as illustrated in FIG. 4b. Thus, the performance of the conventional DNN inference frameworks can be reduced because of increased overall execution time. An example table depicted in FIG. 4c illustrates the performance of the conventional DNN inference frameworks.

FIG. 4d is an example diagram illustrating a frequent memory swapping process associated with launching of the conventional DNN related applications on the embedded device. For example, consider a scenario, wherein a new DNN application (3D Avatar) makes a request for the memory. In response to the request, the memory manager checks whether the DRAM has enough available memory or not. If the DRAM has enough available memory, the memory manager can directly allocate the memory. Otherwise, the memory manager can need to free the memory by writing existing memory content associated with an existing application (video player application) to a swap partition on a secondary memory and later fetch back when required. Further, re-launching the swapped out application (video player application) is slow as the corresponding memory content needs to be read from the swap partition present on the secondary memory. In addition, frequent swapping of the applications can increase the application execution time and decrease the throughput. For example, time taken for executing the 3D avatar application can be 15 secs and throughput of the video player application can be decreased to 10 fps.

FIG. 4e is an example diagram illustrating launching of the conventional DNN related applications after restarting the embedded device. Multiple applications can be running after restarting the embedded device. Consider an example scenario, wherein the conventional DNN related application can request and wait for a memory region after restarting the embedded device. In response to the memory request, another application can be moved to the swap partition in order to allocate the memory region for the DNN related application. The time taken to launch the conventional DNN related applications can include application load time in memory and wait time for the memory region. For example, the conventional method takes 250 ms to launch the DNN related application after the restart of the embedded device. Thus, process of launching the DNN related applications after restarting the embedded device can become slower.

The above information is presented as background information only to assist with an understanding of the present disclosure. No determination has been made, and no assertion is made, as to whether any of the above might be applicable as prior art with regard to the present disclosure.

SUMMARY

The present disclosure has been made to address at least the above problems and/or disadvantages and to provide at least the advantages described below. Accordingly, an aspect of the present disclosure is to provide methods and apparatus for determining memory requirement for processing a DNN model on an embedded device.

Another aspect of the present disclosure is to provided a method and apparatus for identifying reusable memory buffers across processing layers of the DNN model.

Another aspect of the present disclosure is to provided a method and apparatus for determining possibilities for reusing buffer overlap across the processing layers of the DNN model.

In accordance with an aspect of the present disclosure, methods and apparatuses for determining memory requirement for processing a DNN on a device is provided. A method disclosed herein receives at least one DNN model for an input, wherein the at least one DNN model includes a plurality of processing layers. Further, the method includes generating a network graph of the at least one DNN model, wherein a plurality of nodes of the at least one network graph indicates the plurality of processing layers of the DNN model and a plurality of edges of the network graph indicates flow of data between the plurality of processing layers. Further, the method includes identifying at least one execution order of the plurality of processing layers based on the generated network graph. Based on the identified execution order, the method includes determining at least one reuse buffer overlap possibility across the plurality of processing layers using the colored network graph. Based on the determined at least one reuse buffer overlap possibility, the method includes determining and assigning the memory requirement for processing the at least one DNN model.

In a accordance with another aspect of the disclosure, a device, wherein the device includes a memory including a plurality of memory buffers and at least one processor communicatively coupled to the memory. The at least one processor is configured to receive at least one DNN model for an input, wherein the at least one DNN model includes a plurality of processing layers. The at least one processor is further configured to generate a network graph of the at least one DNN model, wherein a plurality of nodes of the at least one network graph indicates the plurality of processing layers of the DNN model and a plurality of edges of the network graph indicates flow of data between the plurality of processing layers. The at least one processor is further configured to identify at least one execution order of the plurality of processing layers based on the generated network graph. The at least one processor is further configured to create a colored network graph of the at least one DNN model using the identified at least one execution order. The at least one processor is further configured to determine at least one reuse buffer overlap possibility across the plurality of processing layers using the colored network graph. The at least one processor is further configured to determine and assign the memory requirement for processing the at least one DNN model based on the determined at least one reuse buffer overlap possibility.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications can be made within the scope of the example embodiments herein without departing from the spirit thereof, and the example embodiments herein include all such modifications.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 4a is an example table illustrating memory buffer requirement for processing DNN models using conventional DNN inference frameworks;

Throughout the drawings, like reference numerals will be understood to refer to like parts, components, and structures.

DETAILED DESCRIPTION

Figure 1:
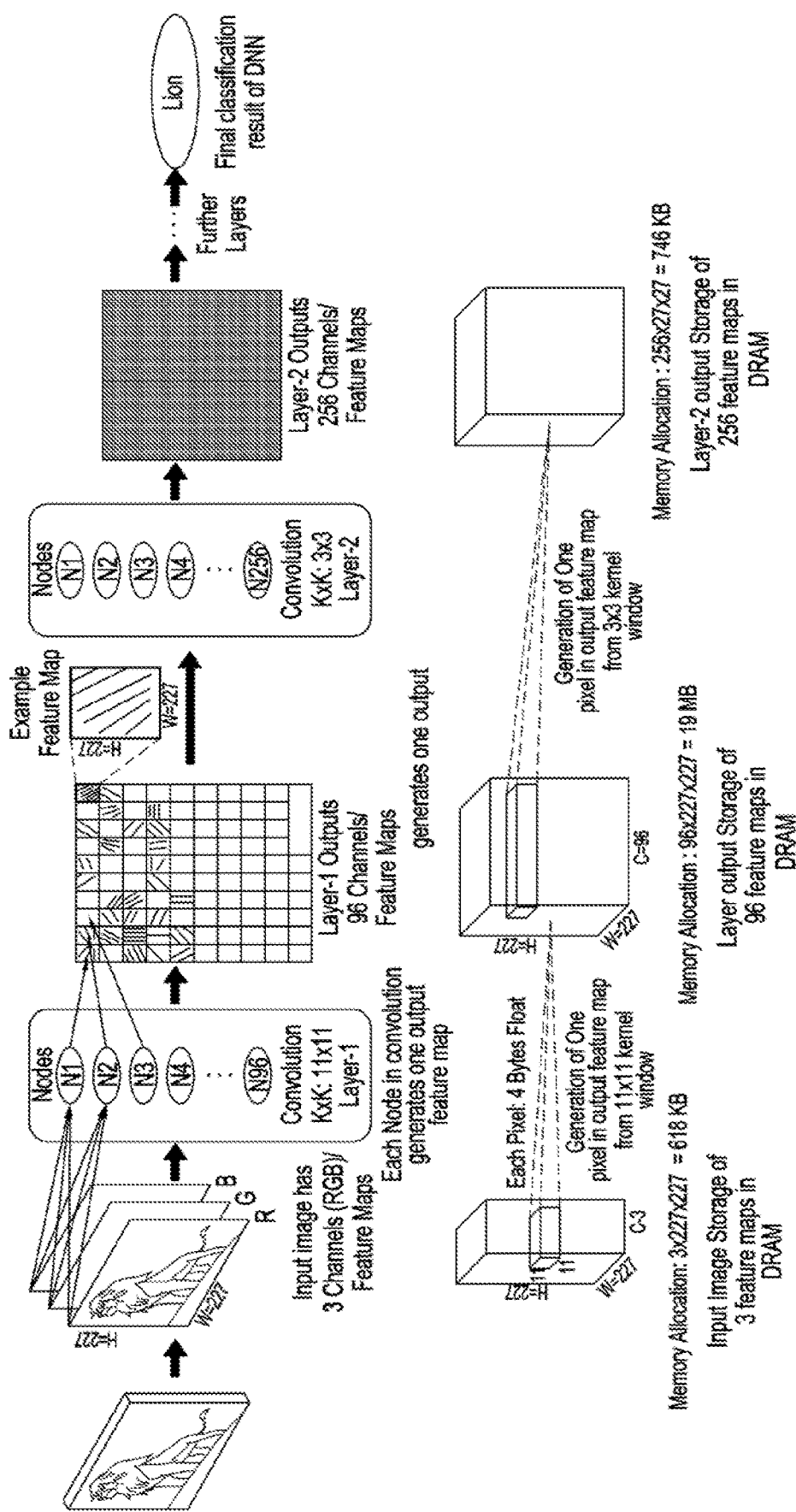
FIG. 1 is an example diagram illustrating an inference stage of a conventional Deep Neural Network (DNN)
Figure 2A:
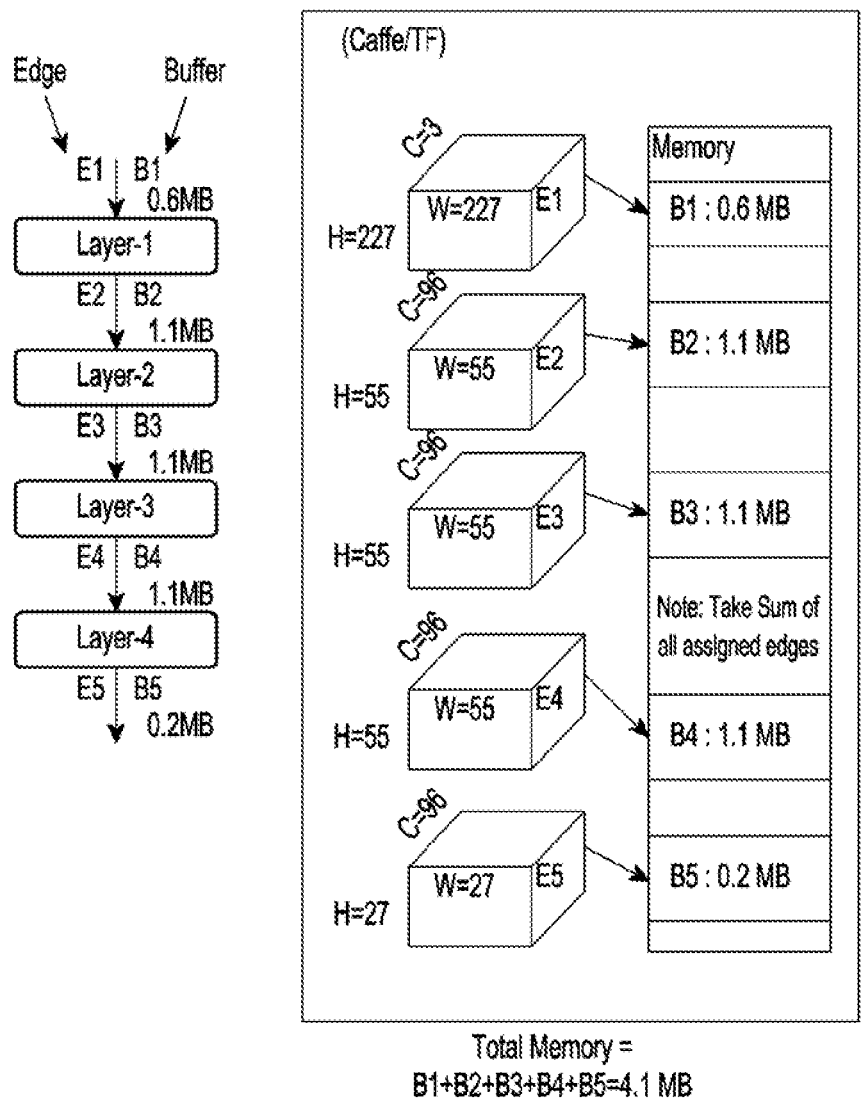
FIGS. 2a and 2b are example diagrams illustrating conventional buffer allocation methods for processing sequential and complex DNNs on an embedded device.
Figure 2B:
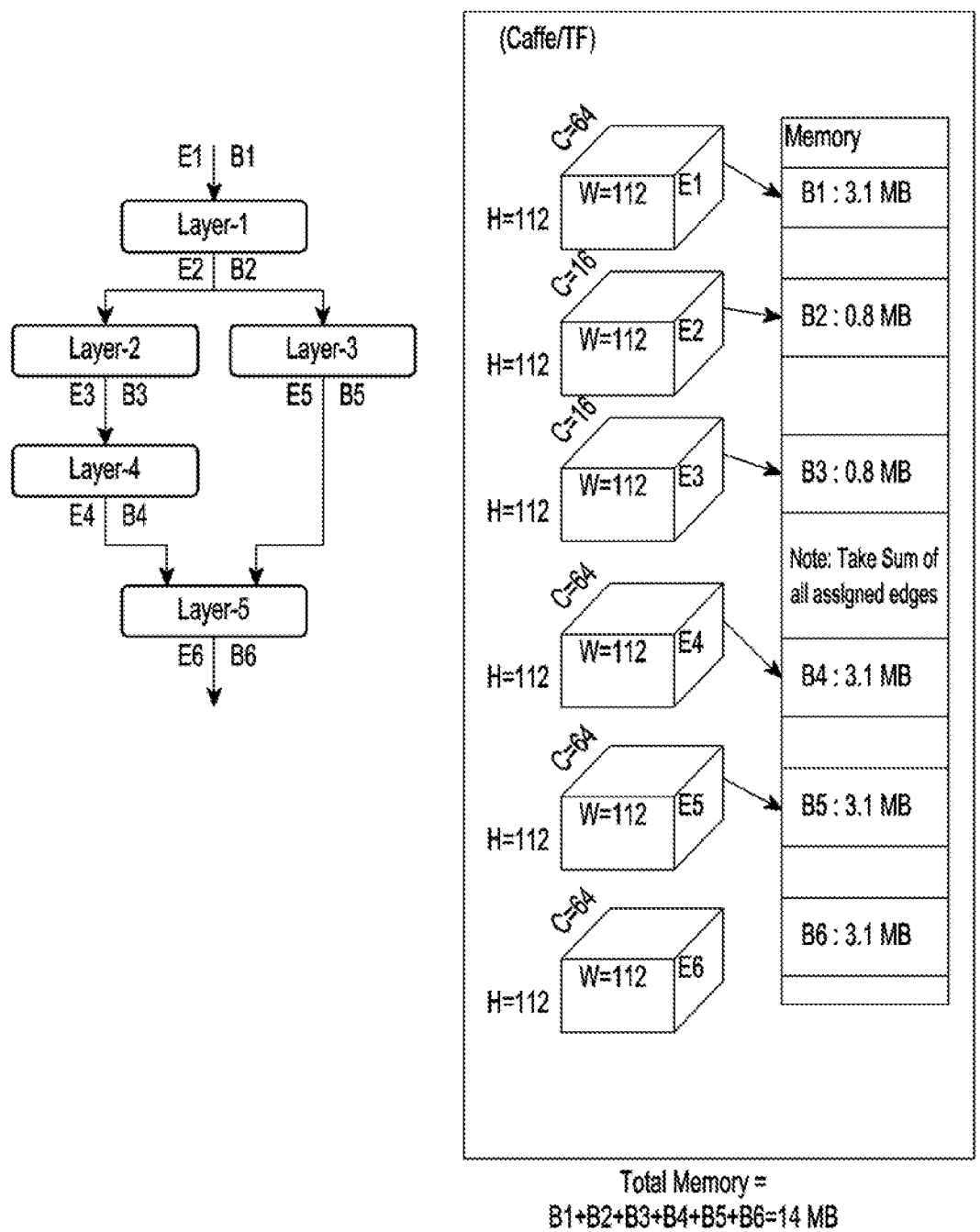
Figure 3:
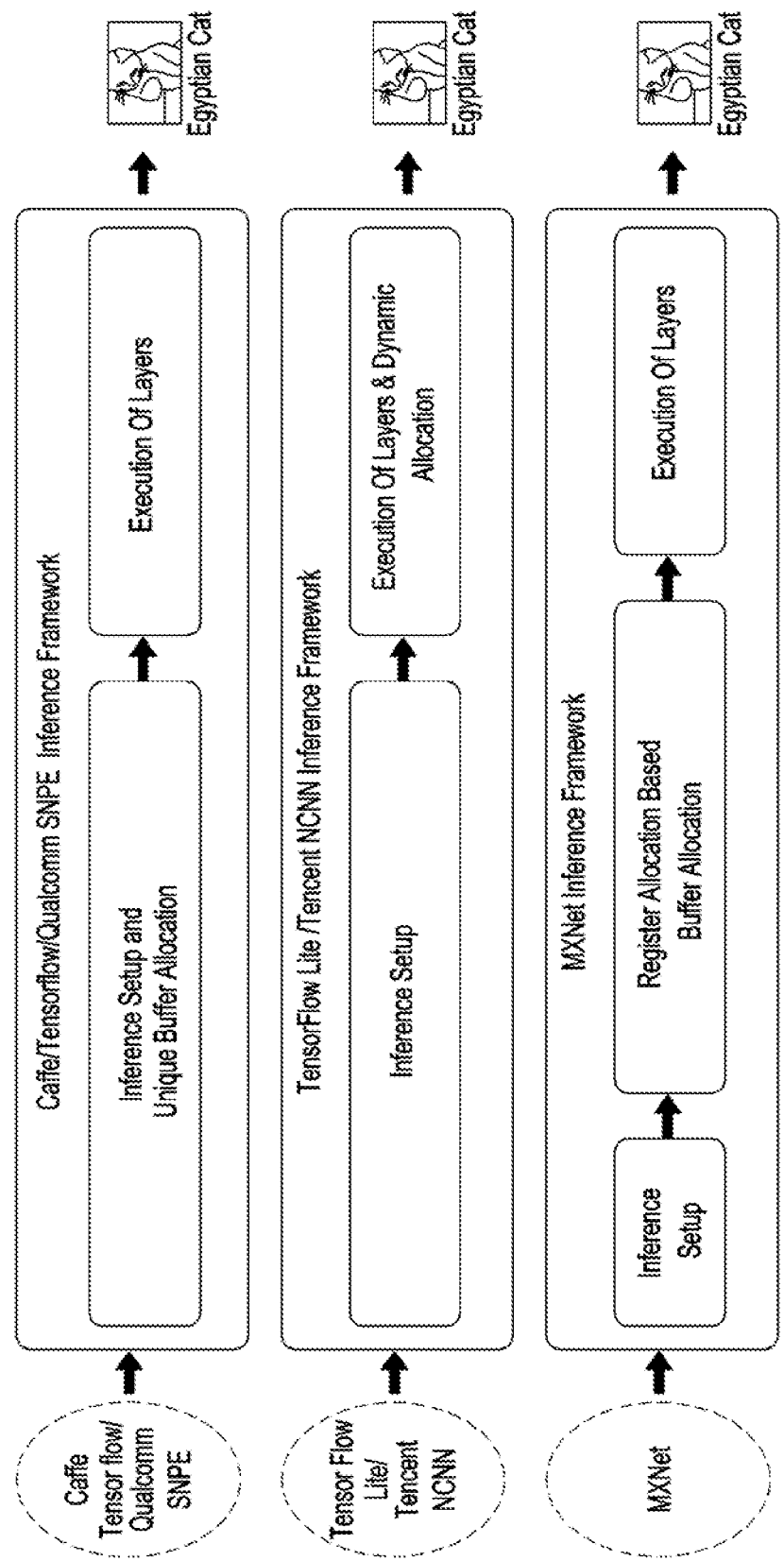
FIG. 3 is an example diagram illustrating memory allocation methods associated with conventional DNN inference frameworks for processing DNN models on an embedded device.
Figures 4B, 4C:
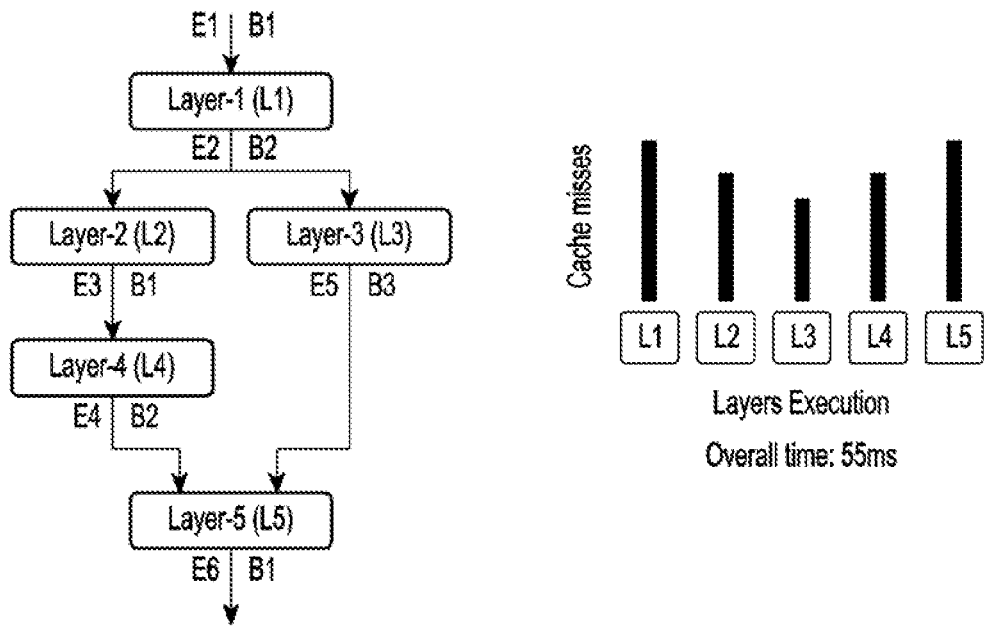
FIGS. 4b and 4c illustrate performance of conventional DNN inference frameworks with respect to cache utilization.
Figure 4D:
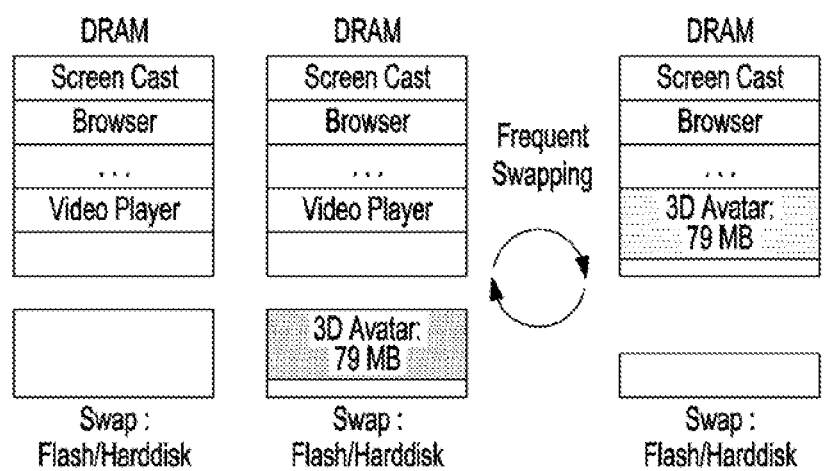
FIG. 4d is an example diagram illustrating a frequent memory swapping process associated with launching of conventional DNN related applications on an embedded device.
Figure 4E:
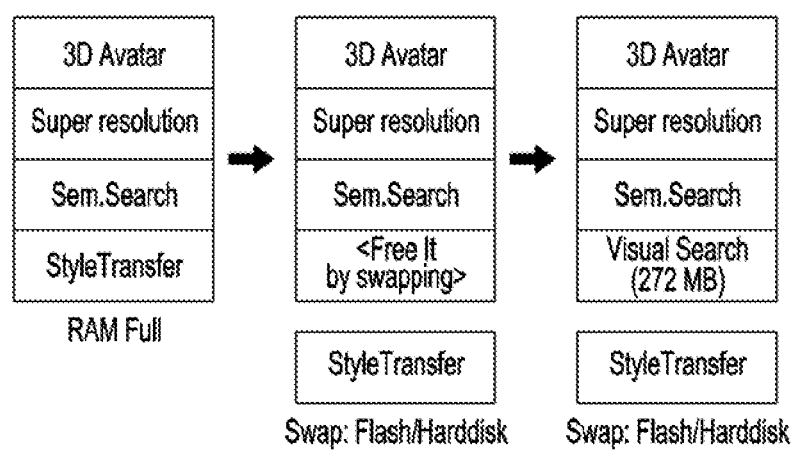
FIG. 4e is an example diagram illustrating launching of conventional DNN related applications after restarting an embedded device.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein disclose methods and systems for determining memory requirement for processing a Deep Neural Network (DNN) model on an embedded device. A method disclosed herein identifies reuse of at least one memory buffer of at least one color for storing at least one output of at least two processing layers of a plurality of processing layers of the DNN model. Further, the method includes determining reuse buffer overlap possibilities across the plurality of processing layers. Based on the determined reuse of the at least one memory buffer and the reuse buffer overlap possibilities, the method includes determining the memory requirement for processing the DNN model on the embedded device. Referring now to the drawings, and more particularly to FIGS. 5 through 16, where similar reference characters denote corresponding features consistently throughout the figures, there are shown example embodiments.

Figure 5:
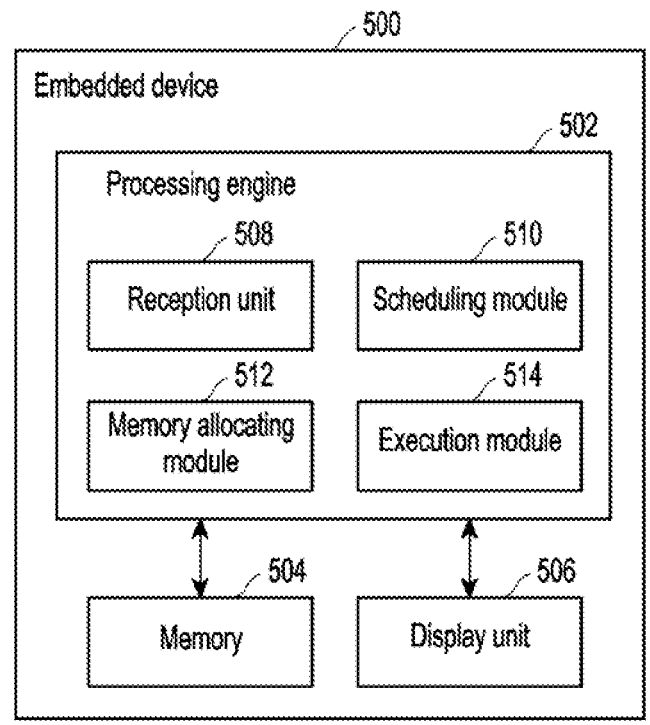
FIG. 5 is an example embedded device for executing an inference phase of a Deep Neural Network (DNN), according to embodiments of the present disclosure.

FIG. 5 is an example embedded device 500 for executing an inference phase of a Deep Neural Network (DNN), according to embodiments of the present disclosure. The DNN uses mathematical modeling to process given input data. The DNN can be used in various applications such as, but not limited to, machine learning applications, computer vision, speech learning, language modeling and autonomous cars. The DNN includes a training phase and an inference/processing phase. The training phase includes generating a DNN model using a large dataset. Examples of the DNN model can be, but not limited to, Deep Belief Networks (DBN), Stacked Auto Encoder (SAE) and Deep Convolution Neural Networks (DCNN). The training phase can be performed on at least one of a cloud, a server, the embedded device 500, and so on. The inference phase includes processing the DNN model generated during the training phase to infer/predict a given input. The inference phase/processing phase can be performed on at least one of the embedded device 500, a cloud (not shown), a server, and so on. Embodiments herein are further explained considering that processing of the DNN model on the embedded device 500, but it can be obvious to a person of ordinary skill in the art that processing of the DNN model can be performed on any other platform/device. The embedded device 500 can be a device comprising a special-purpose computing system. Examples of the embedded device 500 can be, but is not limited to, a mobile phone, a smartphone, tablet, a phablet, a personal digital assistant (PDA), a laptop, a wearable device, an IoT (Internet of Things) device, a vehicle infotainment system, a medical device, a media player, a game console, a digital camera, an household appliance (microwave ovens, refrigerators, washing machines, dish washers and so on), automobiles or any other device on which the DNN model can be deployed.

The embedded device 500 includes a processing engine 502, a memory 504, and a display unit 506. The processing engine 502 can be configured to perform the inference phase of the DNN on the embedded device 500. The inference phase involves processing of the DNN model (trained model) on the embedded device 500. In an embodiment, the processing engine 502 can be, but is not limited to, a single processer, plurality of processors, multiple homogenous cores, multiple heterogeneous cores, multiple Central Processing Unit (CPUs) of different kinds, accelerators (Graphical Processing unit (GPU)) and so on for processing the DNN model. In another embodiment, the processing engine 502 can be located on a single chip or on multiple chips. In yet other embodiment, the processor engine 502 can be integrated with at least one DNN inference framework for processing the DNN model to predict the given input. The processing engine 502 can be communicatively coupled to the memory 504 and the display unit 506. The memory 504 can be a volatile memory including a storage area and a plurality of memory buffers. The storage area and the plurality of memory buffers include a plurality of memory cells. The plurality of memory buffers can be used to store at least one output of a plurality of processing layers of the DNN model during the execution of the inference phase. Embodiments herein are further explained considering a Synchronous Dynamic Random Access Memory (SDRAM) as an example of a memory for efficient storage of the outputs of the processing layers of the DNN model, but it can be obvious to a person of ordinary skill in the art that any other form of Dynamic Random Access Memory (DRAM) or Static Random Access Memory (SRAM) can be considered.

Further, the processing engine 502 includes a reception unit 508, a scheduling module 510, a memory allocating module 512 and an execution module 514. The reception unit 508 can be configured to receive an input for inferring. Examples of the input can be at least one of, but is not limited to, an audio, speech, text, image, video and so on. In an embodiment, the input can be present in the memory 504 of the embedded device 500. In another embodiment, the reception unit 508 can receive input from other devices (mobile phones, sensors, cameras, and so on) through a communication network. Examples of the communication network can be, but is not limited to, at least one of the Internet, a wired network, a wireless network (a Wi-Fi network, a cellular network, Wi-Fi Hotspot, Bluetooth, Zigbee and so on) and so on.

The scheduling module 510 can be configured to receive the DNN model for predicting (inferring a label of the input) the input received from the reception unit 508. In an embodiment, the scheduling module 510 receives the DNN model from at least one of the cloud, the server, or any other device, and so on through the communication network. The DNN model can be the trained model including the plurality of processing layers and corresponding initial memory requirements.

The scheduling module 510 can be configured to create a network graph of the DNN model. The network graph includes nodes and edges. The nodes represent the processing layers of the DNN model and the edges represent the flow of feature map data between the processing layers. The scheduling module 510 can be further configured to identify an execution order of the processing layers of the DNN model using the network graph. In an embodiment, the scheduling module 510 identifies the execution order of the processing layers based on at least one schedule requirement. The schedule requirement can be, but is not limited to, depth first search, breadth first search, or requirements defined in any schedule algorithms. In another embodiment, the schedule module 510 can further schedule execution of at least one of single processing layer of the processing layers and the processing layers on at least one of a single core and multiple processors.

The memory allocating module 512 can be configured to determine and allocate memory buffers (SDRAM memory cells) required for processing the DNN model (the inference/processing phase). On receiving the network graph from the scheduling module 510, the memory allocating module 512 creates a colored network graph of the DNN model. In order to create the colored network graph, the memory allocating module 512 assigns color(s) to the edges present in the network graph of the DNN model. Assigning the color to the edges indicates assignment of the memory buffers of at least one color to the edges associated with each processing layer. Based on the colored network graph, the memory allocating module 512 identifies reuse of a memory buffer(s) of the at least one color for at least two edges. Thus, from the colored network graph, the memory allocating module identifies a number of memory buffers and corresponding sizes required for the processing layers.

After identifying the reuse of the memory buffer(s), the memory allocating module 512 can be further configured to determine reuse buffer overlap possibilities across the processing layers. In an embodiment, the memory allocating module 512 determines reuse buffer overlap possibilities using a two-dimensional (2D) plane layout. Based on the identified reuse of the memory buffer(s) and the reuse buffer overlap possibilities, the memory allocating module 512 determines the size of the memory buffers required for processing the DNN model. The allocating engine 512 assigns a relative address space for the memory buffers required for processing the DNN model. Thus, the allocated memory based on the identified reuse of the memory buffers and the reuse buffer overlap possibilities can be an optimal memory size required for processing the DNN model.

The execution module 514 can be configured to process the DNN model for predicting the input. The execution module 514 executes/processes the processing layers of the DNN model in order to predict the input. The processing layers can be executed by storing the output of each processing layer in the allocated memory buffer. The display unit 506 can be configured to display the prediction of the input. The predicted input can be stored in the memory 504 Thus, the inference phase of the DNN (processing the DNN model) can be performed on the embedded device 500 with reduced memory bandwidth and computational requirements.

FIG. 5 shows exemplary units of the embedded device 500, but it is to be understood that other embodiments are not limited thereon. In other embodiments, the embedded device 500 can include less or a greater number of units. Further, the labels or names of the units are used only for illustrative purpose and does not limit the scope of the embodiments herein. One or more units can be combined together to perform same or substantially similar function in the embedded device 500.

Figure 6:
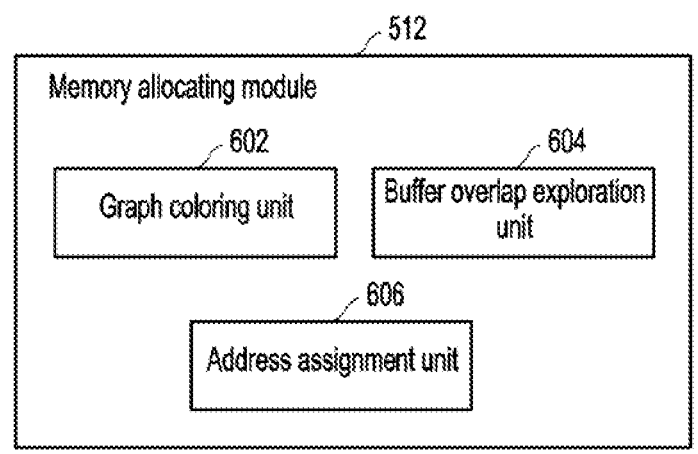
FIG. 6 is a block diagram illustrating units of a memory allocating module for allocating a memory for processing a DNN model on an embedded device, according to embodiments of the present disclosure.

FIG. 6 is a block diagram illustrating units of a memory allocating module 512 for allocating the memory for processing the DNN model on the embedded device 500, according to embodiments of the present disclosure. The memory allocating module 512 includes a graph coloring unit 602, a buffer overlap exploration unit 604 and an address assignment unit 606.

The graph coloring unit 602 can be configured to form the colored network graph of the DNN model. On receiving the network graph of the DNN model from the scheduling unit 510, the graph coloring unit 602 assigns the colors to the edges present in the network graph of the DNN model. In an embodiment, assignment of the colors to the edges indicates assignment of the memory buffers of the at least one color to the edges. Embodiments herein use the terms 'colors, 'the memory buffers of at least one color', and so on interchangeably and can refer to assignment of the memory buffer of the at least one color to each edge associated with each processing layer.

The graph coloring unit 602 iterates through each edge of a scheduled node of the nodes (a scheduled processing layer) and picks the color which is available in a "FreeColorList" for assigning to each edge of the scheduled node. In an embodiment, assignment of the color to each edge indicates the assignment of the memory buffer and corresponding color to each edge. The "FreeColorList" is a table including a list/entry of colors, associated with the memory buffers. In case of unavailability of color (memory buffer) in the "FreeColorList", the graph coloring unit 602 creates a new color entry in the "FreeColorList". In an embodiment, the graph coloring unit 602 assigns the colors to at least one input edge and at least one output edge of each processing layer. The colors assigned to the at least one input edge and the at least one different edge are not same. After assigning the colors to the at least one output edge, the graph coloring unit 602 releases the color assigned to the at least one input edge and adds to the "FreeColorList". The released color can be assigned to output edges of successive processing layers.

In an embodiment, the graph coloring unit 602 creates the colored network graph in such a way that at least two adjacent edges can be assigned with the different color/memory buffer. In another embodiment, the graph coloring unit 602 can assign the same color/memory buffer to at least two edges (non-adjacent edges) based on the released color/memory buffer. Embodiments herein imply that assignment of the same color to the at least two edges indicates reuse of the same memory buffer for the at least two edges.

The buffer overlap exploration unit 604 can be configured to determine the reuse buffer overlap possibilities across the processing layers. On receiving the colored network graph of the DNN model, the buffer overlap exploration unit 604 identifies the reuse of the memory buffer(s) by the at least two edges the colored network graph. The buffer overlap exploration unit 604 identifies the reuse of the memory buffer(s) based on the assignment of the same color to the at least two edges of the colored network graph. After identifying the reuse of the memory buffer(s), the buffer overlap exploration unit 604 determines a size of each memory buffer (of the memory buffers assigned for the edges) of the at least one color assigned for each edge. A total size of the memory buffer of the at least one color can be equal to a maximum buffer size requirements of the at least two edges assigned with that memory buffer of the at least one color. Based on the determined size of the memory buffers, the buffer overlap exploration unit 604 assigns a start and end non-overlapping virtual address for the memory buffers. Further, the buffer overlap exploration unit 604 assigns a start layer index and an end layer index to each edge.

After assigning the virtual address for each memory buffer, the buffer overlap exploration unit 604 generates the 2D plane layout to explore the reuse buffer overlap possibilities. In the 2D plane layout, an X-axis and Y-axis represent a layer index (number of each processing layer of the DNN model) and an address space respectively. Further, in the 2D plane layout, rectangular boxes can be generated for the edges associated with the processing layers. A rectangular box of the rectangular boxes indicates the memory buffer of the at least one color assigned to the edge. The rectangular box can be assigned with the color of the corresponding memory buffer. A start address of the rectangular box indicates the virtual start address of the corresponding memory buffer of the at least one color. An end address of the rectangular box can be based on the size of the memory buffer required for the corresponding edge. Further, the height of the rectangular box indicates the size of the memory buffer and the width of the rectangular box indicates liveliness/dependencies of the memory buffer across the processing layers.

The buffer overlap exploration unit 604 can be further configured to sort the rectangular boxes (associated with the edges) corresponding to the memory buffers based on factors, such as, but not limited to, a start address, a size of each rectangular box corresponding to each memory buffer, a layer index and so on. Based on the sorted rectangular boxes, the buffer overlap exploration unit 604 determines buffer overlap possibilities by identifying overlap possibilities across the rectangular boxes on the 2D plane layout. Further, in response to identifying at least one gap between the rectangular boxes of the different color, the buffer overlap exploration unit 604 compresses/squeezes the rectangular box(es) towards the Y-axis. In an embodiment, the buffer overlap exploration unit 604 compresses the rectangular box(es) based on constraints such as, but not limited to, liveliness of the buffer memory and layer dependencies. The buffer overlap exploration unit 604 compresses the rectangular box(es) by fitting the rectangular box in the identified gap between the rectangular boxes of the different color. The start address of the compressed rectangular box(es) can be adjusted with a lower address value. Compressing the rectangular box(es) indicates change in address assignment for the memory buffer(s) corresponding to the compressed rectangular box(es).

The address assignment unit 606 can be configured to determine the size of the memory buffers required for processing the DNN model. Further, the address assignment unit 606 assigns relative offsets/address space for the memory buffers based on the explored reuse memory buffer overlap possibilities. The address assignment unit 606 assigns the relative address space based on the start address of the corresponding rectangular box in the 2D plane layout, wherein the 2D plane layout includes at least one compressed rectangular box. Thus, an optimal memory bandwidth can be allocated for performing the inference phase of the DNN model on the embedded device.

FIG. 6 shows exemplary units of the memory allocating module 512, but it is to be understood that other embodiments are not limited thereon. In other embodiments, the memory allocating module 512 can include less or a greater number of units. Further, the labels or names of the units are used only for illustrative purpose and does not limit the scope of the embodiments herein. One or more units can be combined together to perform same or substantially similar function in the memory allocating module 512.

Figure 7:
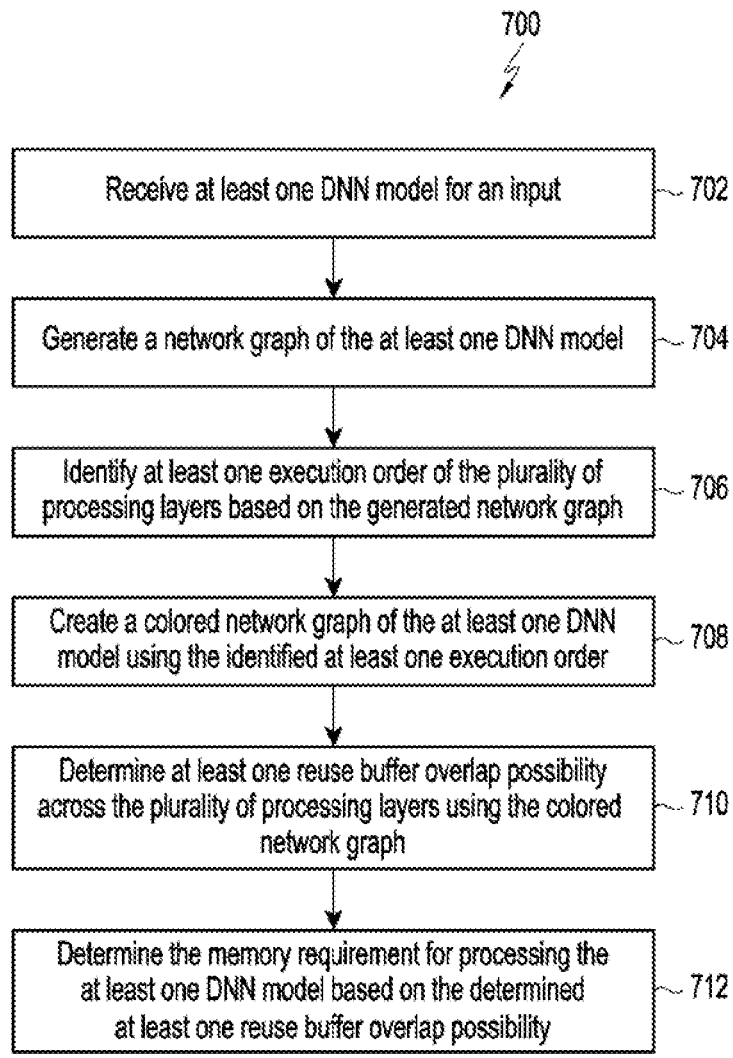
FIG. 7 is a flow diagram illustrating a method for determining a memory required for processing a DNN model on an embedded device, according to embodiments of the present disclosure.

FIG. 7 is a flow diagram 700 illustrating a method for determining the memory required for processing the DNN model on an embedded device 500, according to embodiments of the present disclosure.

At operation 702, the method includes receiving, by the scheduling module 510, the DNN model for the input. The DNN model can be the trained model including the processing layers. At operation 704, the method includes generating, by the scheduling module 510, the network graph of the DNN model. The network graph includes the nodes representing the processing layers of the DNN model and the edges indicating the feature map data flow between the processing layers.

At operation 706, the method includes identifying, by the scheduling module 510, the execution order of the processing layers. At operation 708, the method includes, creating, by the graph coloring unit 602 of the memory allocating module 512, the colored network graph using the identified execution order. The graph coloring unit 602 assigns the colors to the edges the network graph. The graph coloring unit 602 assigns the colors to the edges based on the execution order of the plurality of processing layers of the DNN model and liveliness of the edges. The assignment of the colors to the edges represents the assignment of the memory buffers of the at least one color to the edges associated with the processing layers.

At operation 710, the method includes, determining, by the buffer overlap exploration unit 604 of the memory allocating module 512, the reuse buffer overlap possibilities across the processing layers of the DNN model using the colored network graph. The buffer overlap exploration unit 604 receives the colored network graph of the DNN model from the graph coloring unit 602 and determines the reuse of the memory buffer(s) by the at least two edges. Based on the determined reuse, the buffer overlap exploration unit 604 determines the size of memory buffers assigned for the edges associated with the processing layers. Further, the buffer overlap exploration unit 604 generates the 2D plane layout for the edges. Based on the 2D plane layout, the buffer overlap exploration unit 604 determines the reuse buffer overlap possibilities across the processing layers of the DNN model.

At operation 712, the method includes, determining, by the address assignment unit 606 of the memory allocating module 512, the memory requirement for processing the DNN model based on the reuse buffer overlap possibilities. The address assignment unit 606 calculates the size of the memory buffers required for processing the DNN model based on the determined reuse buffer overlap possibilities. The address assignment unit 606 further assigns the relative address space for the memory buffers assigned to the edges associated with the processing layers using the 2D plane layout. Thus, optimal memory bandwidth can be utilized for processing the DNN model on the embedded device 500.

The various actions, acts, blocks, operations, or the like in the method and the flow diagram 700 can be performed in the order presented, in a different order or simultaneously. Further, in some embodiments, some of the actions, acts, blocks, operations, or the like can be omitted, added, modified, skipped, or the like without departing from the scope of the invention.

Figure 8:
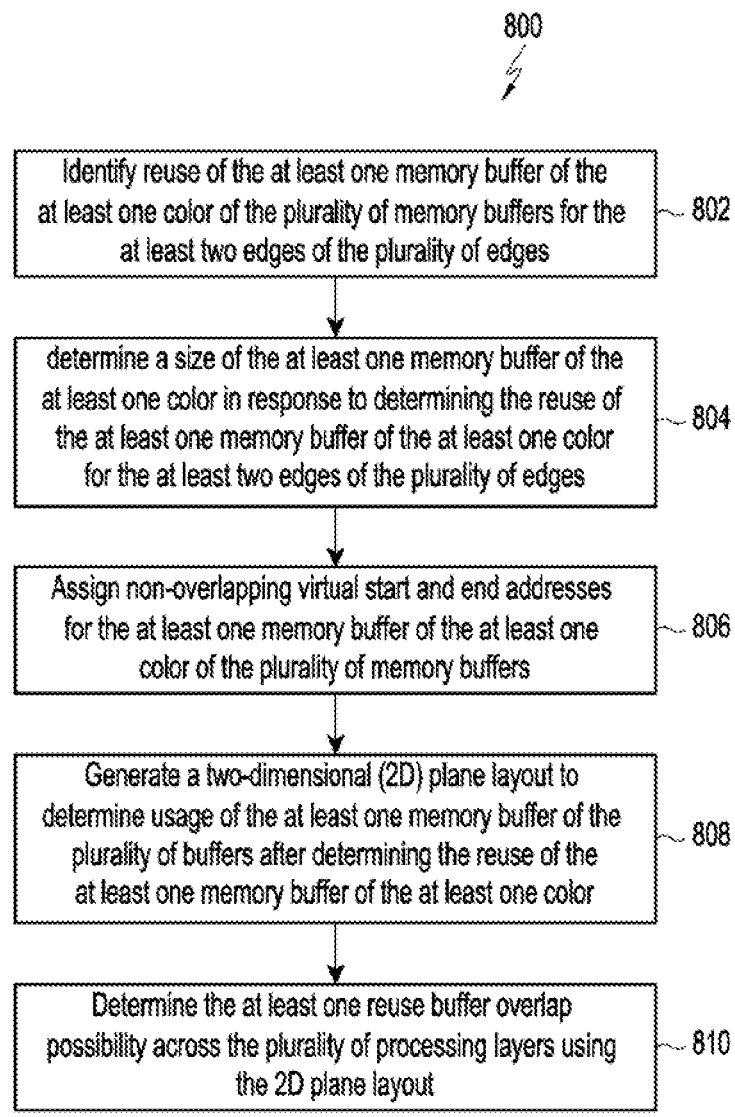
FIG. 8 is a flow diagram illustrating a method for determining reuse buffer overlap possibilities across processing layers of a DNN model, according to embodiments of the present disclosure.

FIG. 8 is a flow diagram 800 illustrating a method for determining the reuse buffer overlap possibilities across the processing layers of the DNN model, according to embodiments of the present disclosure.

At operation 802, the method includes, identifying, by the buffer overlap exploration unit 604 of the memory allocating module 512, the reuse of the memory buffer(s) of the at least one color for the at least two edges. On receiving the colored network graph from the graph coloring unit 602, the buffer overlap exploration unit 604 identifies the assignment of the same color to the at least two edges. The assignment of the same color to the at least two edges indicates the reuse of the memory buffer(s).

At operation 804, the method includes determining, by the buffer overlap exploration unit 604, the size of the memory buffers of in response to determining the reuse of the memory buffer(s) of the at least one color for the at least two edges. The determined size of each memory buffer indicates the maximum memory required for the at least two edges which are assigned with that memory buffer of the at least one same color.

At operation 806, the method includes assigning, by the buffer overlap exploration unit 604, non-overlapping virtual start and end addresses for the memory buffers. The buffer overlap exploration unit 604 assigns the non-overlapping virtual addresses based on the determined size of the at least one memory buffer after identifying the reuse of the at least one memory buffer.

At operation 808, the method includes generating, by the buffer overlap exploration unit 604, the 2D plane layout to determine usage of the memory buffers after determining the reuse of the memory buffer(s) of the at least one color. The 2D plane layout includes the rectangular boxes for the edges of the colored network graph of the DNN model. Each rectangular box present in the 2D plane layout corresponds to the memory buffer of the at least one color assigned to each edge. Further, the buffer overlap exploration unit 604 assigns each rectangular box with the color of the corresponding memory buffer.

At operation 810, the method includes determining, by the buffer overlap exploration unit 604, the reuse buffer overlap possibility across the processing layers using the 2D plane layout. The buffer overlap exploration unit 604 sorts the rectangular boxes corresponding to the memory buffers assigned to the edges based on at least one of a size of the memory buffer of the at least one color, a start address of the rectangular box corresponding to the memory buffer, a layer index and so on. Based on the sorted rectangular boxes, the buffer overlap exploration unit 604 determines the overlap possibilities across the rectangular boxes of the different color to determine the reuse buffer overlap possibilities across the processing layers. The reuse buffer overlap possibilities can be determined with respect to at least one of liveliness constraint associated with at least one memory buffer, at least one dependency constraints associated with the plurality of processing layers and so on. Further, the buffer overlap exploration unit 604 squeezes the at least one rectangular box on the 2D plane layout in response to determining zero overlap possibility across the rectangular boxes of the different color. The buffer overlap exploration unit 604 assigns a lower value address to the at least one squeezed rectangular box, wherein assigning the lower value to the at least one squeezed rectangular box indicates assigning a new start address and a new end address for the at least one memory buffer of the at least one color corresponding to the at least one squeezed rectangular box.

The various actions, acts, blocks, operations, or the like in the method and the flow diagram 800 can be performed in the order presented, in a different order or simultaneously. Further, in some embodiments, some of the actions, acts, blocks, operations, or the like can be omitted, added, modified, skipped, or the like without departing from the scope of the invention.

Figure 9:
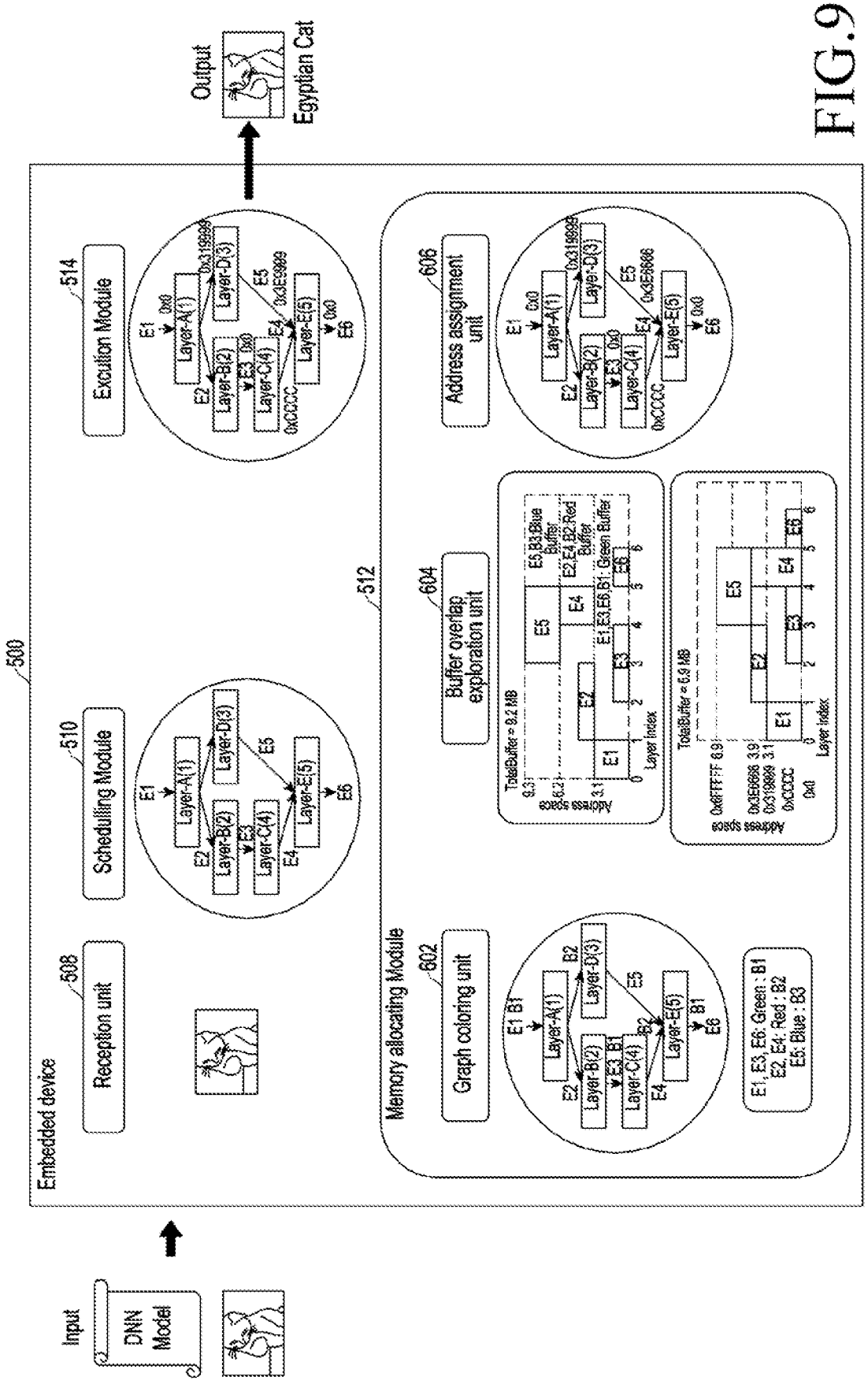
FIG. 9 is an example embedded device, wherein an optimal memory can be allocated for processing a DNN model, according to embodiments of the present disclosure.

FIG. 9 is an example embedded device 500, wherein an optimal memory can be allocated for processing the DNN model, according to embodiments of the present disclosure. As illustrated in FIG. 9, the reception unit 508 of the embedded device receives the input. For example, the input can be an image. Once the input is received, the scheduling module 510 receives the DNN model for the given input. The received DNN model can be the trained model including a plurality of processing layers. For example, the received DNN model can include five processing layers (a layer-A, a layer-B, a layer-C, a layer-D and a layer-E). The scheduling module 510 generates the network graph of the DNN model. The network graph includes five nodes to represent the five processing layers and six edges (E1, E2, E3, E4, E5 and E6) for representing the data flow between the five processing layers. The scheduling module 510 determines the execution order of the five processing layers. The scheduling module 510 feeds the network graph of the DNN model to the memory allocating module 512.

The graph coloring unit 602 of the memory allocating module 512 creates the colored network graph of the DNN model. On receiving the network graph, the graph coloring unit 602 assigns the colors to the six edges. Assignment of the colors to the edges indicates the assignment of the at least one memory buffer to each edge. The graph coloring unit 602 assigns the color to each edge in such a way that no two adjacent edges can be assigned with the same color. For example, the graph coloring unit 602 assigns a green color to the edges E1, E3 and E6, which represents the assignment of a same memory buffer B1 of green color to the edges E1, E3 and E6. Similarly, the graph coloring unit 602 assigns a red color to the edges E2 and E4 which represents the assignment of a same memory buffer B2 of red color to the edges E2 and E4. Similarly, the graph coloring unit 602 assigns a blue color to the edge E5, which represents the assignment of a memory buffer B3 of blue color to the edge E5. Further, the graph coloring unit 602 feeds the colored network graph to the buffer overlap exploration unit 604.

On receiving the colored network graph of the DNN model, the buffer overlap exploration unit 604 determines reuse of the at least one memory buffer by the at least two edges. The colored network graph determines the reuse of the memory buffer B1 by the edges E1, E3 and E6, and the memory buffer B2 by the edges E2 and E4. After determining the reuse of the at least one memory buffer, the buffer overlap exploration unit 604 identifies the size of each memory buffer (B1, B2 and B3). A size of the memory buffer B1 can be equal to the maximum memory required by the edges E1, E3 and E6. A size of the memory buffer B2 can be equal to the maximum buffer required by the edges E2 and E4. A size of the memory buffer B3 can be equal to the maximum buffer required by the edge E5. Based on the size of each memory buffer, the buffer overlap exploration unit 604 assigns the virtual start and end address for the memory buffer B1, B2 and B3. In an embodiment, reuse of the same memory buffer by the at least two edges results in a 35% memory bandwidth reduction for processing the DNN model.

Further, the buffer overlap exploration unit 604 generates the 2D plane layout for exploring the reuse buffer overlap possibilities across the memory buffers of the different color. The reuse buffer overlap possibilities can be determined based on the constraints such as, but not limited to, liveliness of each memory buffer and the dependencies across the processing layers. Further, the buffer overlap exploration unit 604 adjusts the address space of the at least one memory buffer (for example rectangular box E4 corresponding to memory buffer B2 and rectangular box E5 corresponding to memory buffer B3) based on the explored reuse buffer overlap possibilities. Thereafter, the address assignment unit 608 of the memory allocating module 512 assigns the relative address space for the memory buffers B1, B2, B3 corresponding to the six edges. The executing module 514 executes the five processing layers for predicting the label of the input image. An output (intermediate feature maps) of each processing layer can be stored in the allocated memory buffer. Thus, the inference stage of the DNN model for performing the label of the given input can be performed with minimal bandwidth requirements.

Figure 10A:
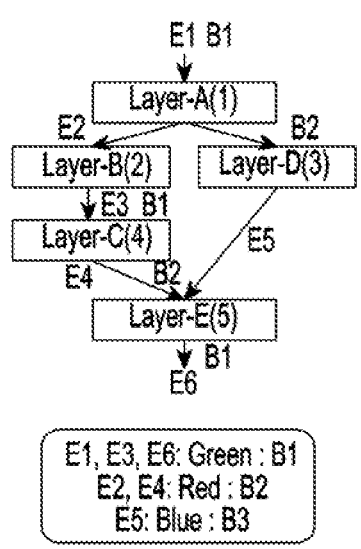
FIGS. 10a and 10b are example diagrams illustrating creation of a colored network graph of a DNN model, according to embodiments of the present disclosure.
Figure 10B:
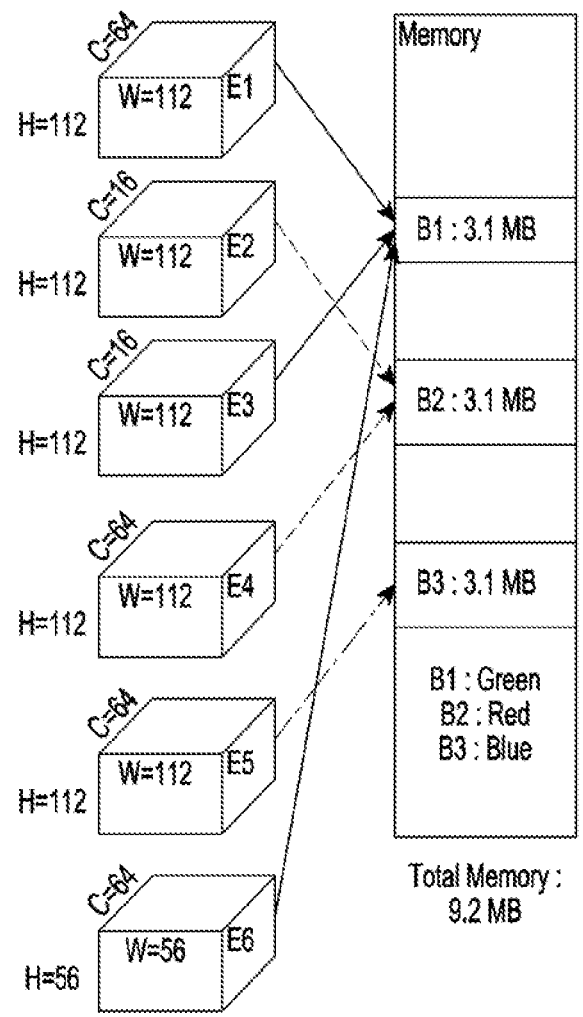

FIGS. 10*a* and 10*b* are example diagrams illustrating the creation of the colored network graph of the DNN model, according to embodiments of the present disclosure. Embodiments herein enable the graph coloring unit 602 to create the colored network graph of the DNN model based on execution order of the plurality of processing layers of the DNN model. For example, the received DNN model can include five processing layers (a layer-A, a layer-B, a layer-C, a layer-D and a layer-E). The network graph of the DNN model includes five nodes to represent the five processing layers and six edges (E1, E2, E3, E4, E5 and E6) for representing the data flow between the five processing layers. Further, the network graph provides information about initial memory requirement for each edge (for storing the output of each processing layer). For example, the edge E1 can require 3.1 MB, the edge E2 can require 0.8 Mb, the edge E3 can require 0.8 MB, the edge E4 can require 3.1 MB, the edge E5 can require 3.1 MB and the edge E6 can require 3.1 MB.

Based on the network graph of the DNN model, the graph coloring unit 602 assigns the color to the six edges based on the execution order and liveliness of each edge. Assignment of the color indicates the assignment of the at least one memory buffer corresponding to that color for each edge. In an embodiment, no two adjacent edges of the six edges can be assigned with the same color. Further, assignment of the same color to the at least two edges represents the reuse of the same memory buffer corresponding to the assigned color. For example, the graph coloring unit 602 assigns the memory buffer B1 of green color to the edges E1, E3 and E6, the memory buffer B2 of red color to the edges E2 and E4 and the memory buffer B3 to the edge E5 as illustrated in FIG. 10*a*.

The size of each memory buffer can be equal to the maximum memory requirement of the at least two edges assigned with that same memory buffer. As illustrated in FIG. 10*b*, the size of the memory buffer can be equal to 3.1 MB since the edge E1 among E1, E3 and E6 (edges assigned with same memory buffer B1) requires the maximum memory requirement of 3.1 MB. Similarly, the size of memory buffer can be equal to 3.1 MB since the edge E4 among the edges E2 and E4 require maximum memory requirement of 3.1 MB. The size of the memory buffer can be equal to memory requirement of the edge E5 which can be equal to 3.1 MB. Thus, reusing the buffers by creating the colored network graph results in 35% reduction in overall total memory requirement for processing the DNN model on the embedded device 500.

Figure 10C:
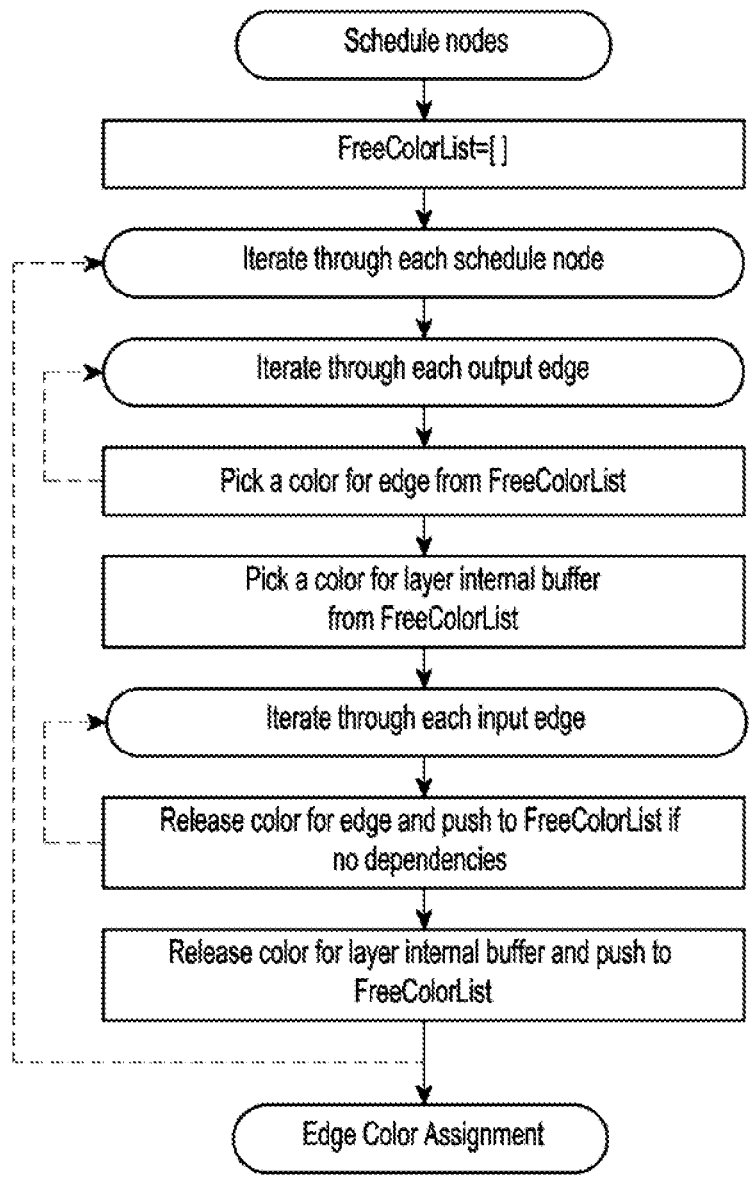
FIG. 10c is an example flow diagram illustrating a method for creating a colored network graph of a DNN model, according to embodiments of the present disclosure.

FIG. 10*c* is an example flow diagram illustrating a method for creating the colored network graph of the DNN model, according to embodiments of the present disclosure. As illustrated in FIG. 10*c*, the graph coloring unit 602 receives the network graph and the information about the execution order of the plurality of processing layers from the scheduling module 510.

For example, the network graph can include five nodes to represent the five processing layers and six edges (E1, E2, E3, E4, E5 and E6) for representing the data flow between five processing layers (layer-A, layer-B, layer-C, layer-D, layer-E). The graph coloring unit 602 iterates through each scheduled node and each output edge of the scheduled node for selecting the color (the memory buffer) which is available in the "FreeColorList" to assign to each output edge associated with the scheduled node. The input and output edges of each scheduled node can be assigned with minimum number of colors such that no two adjacent edges can have the same color and buffer liveliness in the execution order.

In an embodiment, the graph coloring unit 602 selects the color from the "FreeColorList", if any processing layer requires the memory buffer/internal buffer. Further, after assigning the color to all the output edges of the scheduled node, the graph coloring unit releases the color assigned to the input edge of the scheduled node. Thus, the released color (the memory buffer) can be added to the "FreeColorList" and reused for the edges of the successive processing layers.

Consider a scenario, wherein the scheduled node can be the layer-A and the input and output edges of the layer-A can be the edge E1 and the edge E2 respectively. The graph coloring unit 602 selects the green color for assigning to the input edge E1 of the layer-A and the red color for assigning to the output edge E2. After assigning the red color to the output edge E2 of the layer-A, the graph coloring unit releases the color assigned to the input edge of the layer-A. The green color can be released and added to the "FreeColorList". Thus, the green color can be assigned to the output edge E3 of the layer-B and the layer-E.

Figure 11A:
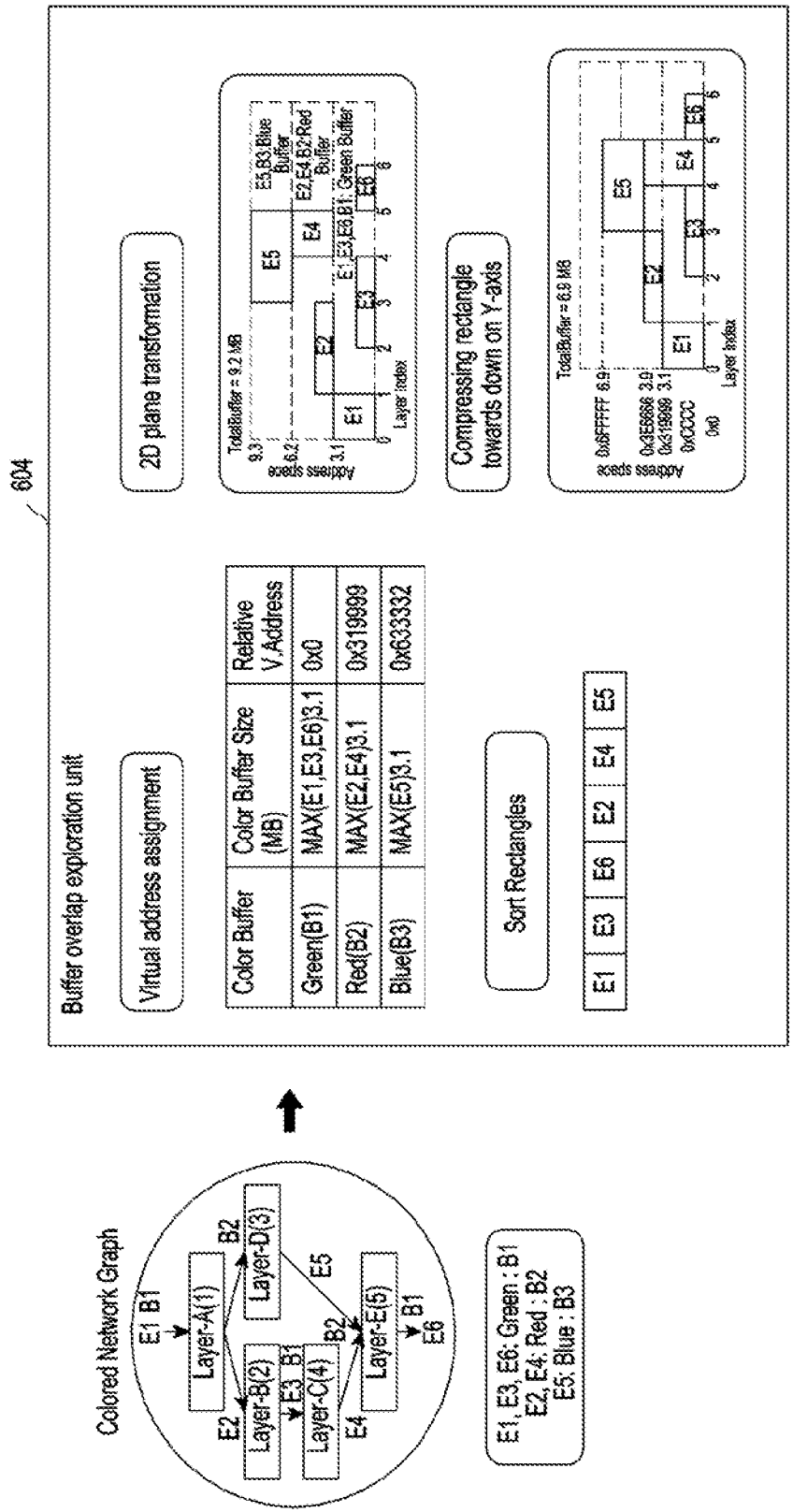
FIG. 11a is an example diagram illustrating identification of the reuse buffer overlap possibilities across the processing layers of the DNN model, according to embodiments of the present disclosure.

FIG. 11*a* is an example diagram illustrating identification of the reuse buffer overlap possibilities across the processing layers of the DNN model, according to embodiments of the present disclosure. Embodiments herein enable the buffer overlap exploration unit 604 to determine the reuse buffer overlap possibilities across the processing layers of the DNN model. The buffer overlap exploration unit receives the colored network graph from the graph coloring unit 602 and determines the reuse of the at least one buffer by the at least two edges of the network graph. The buffer overlap exploration unit 604 can determine the reuse of the at least one buffer based on the assignment of the same color to the at least two edges. As illustrated in FIG. 11*a*, the buffer overlap exploration unit 604 determines the reuse of memory buffer B1 of green color for edges E1, E3 and E6 and the memory buffer B2 of red color for edges E2 and E4. After determining the reuse of the memory buffers B1 and B2, the buffer overlap exploration unit 604 determines the size of the memory buffers B1, B2 and B3. The size of each memory buffer can be equal to the maximum memory requirement of the edge of the at least two edges assigned with the same memory buffer. The size of the memory buffer B1 can be equal to the size of the memory required by the edge E1, the size of the memory buffer B2 can be equal to the size of the memory required by the edge E4 and the size of the memory buffer B3 can be equal to the memory size required by the edge E5.

After determining the size of the memory buffers B1, B2, B3, the buffer overlap exploration unit 604 assigns the non-overlapping virtual address for the memory buffers B1, B2 and B3. The virtual address assigned to the memory buffers B1, B2 and B3 can be 0x0, 0x319999 and 0x633332 respectively.

Further, the buffer overlap exploration unit 604 generates the 2D plane layout to determine the buffer overlap possibilities across the five processing layers. In the 2D plane layout, the X-axis represents the address space assigned for the memory buffer corresponding to each edge and the Y-axis represents the layer index. Further, in the 2D plane layout, memory buffers corresponding to the edges E1, E2, E3, E4, E5 and E6 are positioned as the rectangular boxes E1, E2, E3, E4, E5 and E6 respectively. The rectangular boxes can be assigned with the color of the corresponding memory buffers. The rectangular boxes E1, E3 and E6 can be assigned with the green color as the corresponding edges associated with the rectangular boxes are assigned with the memory buffer B1 which is of green color. Similarly, the rectangular boxes E2 and E4 can be assigned with the red color as the corresponding edges (E2 and E4) associated with the rectangular boxes (E2 and E4) are assigned with the memory buffer B2 which is of red color. The rectangular box E5 can be assigned with the blue color as the corresponding edge associated with the rectangular box E5 is assigned with the memory buffer B3 which is of blue color. The height of the rectangular box represents the size of the memory buffer (B1 or B2 or B3) assigned for the corresponding edge and the width of the rectangular box represents the liveliness of the memory buffer. Further, the buffer overlap exploration unit 604 sorts the rectangular boxes E1, E2, E3, E4, E5 and E6 based on the factors such as, color of each memory buffer, size of each memory buffer, start address and so on. Based on the sorted rectangular boxes, the buffer overlap exploration unit 604 determines overlapping across the rectangular boxes of different color based on the constraints such as, but not limited to, liveliness of the memory buffer (B1/B2/B3) and dependencies across the processing layers (layer A-layer E). In response to determining non-overlapping possibilities between the rectangular boxes of different color and gap between the rectangular boxes E3 and E4, the buffer overlap exploration unit 604 squeezes/compresses the rectangular box E4 down the Y-axis to fit in the identified gap. The address of the rectangular box E4 can be adjusted with a lower address value which indicates the adjustment of the address assigned to the memory buffer B2 assigned to the edge E4. Thus, adjusting the address the memory buffers with lower address value based on the explored buffer overlap possibilities further reduces the memory bandwidth required for processing the DNN model on the embedded device 500.

Figure 11B:
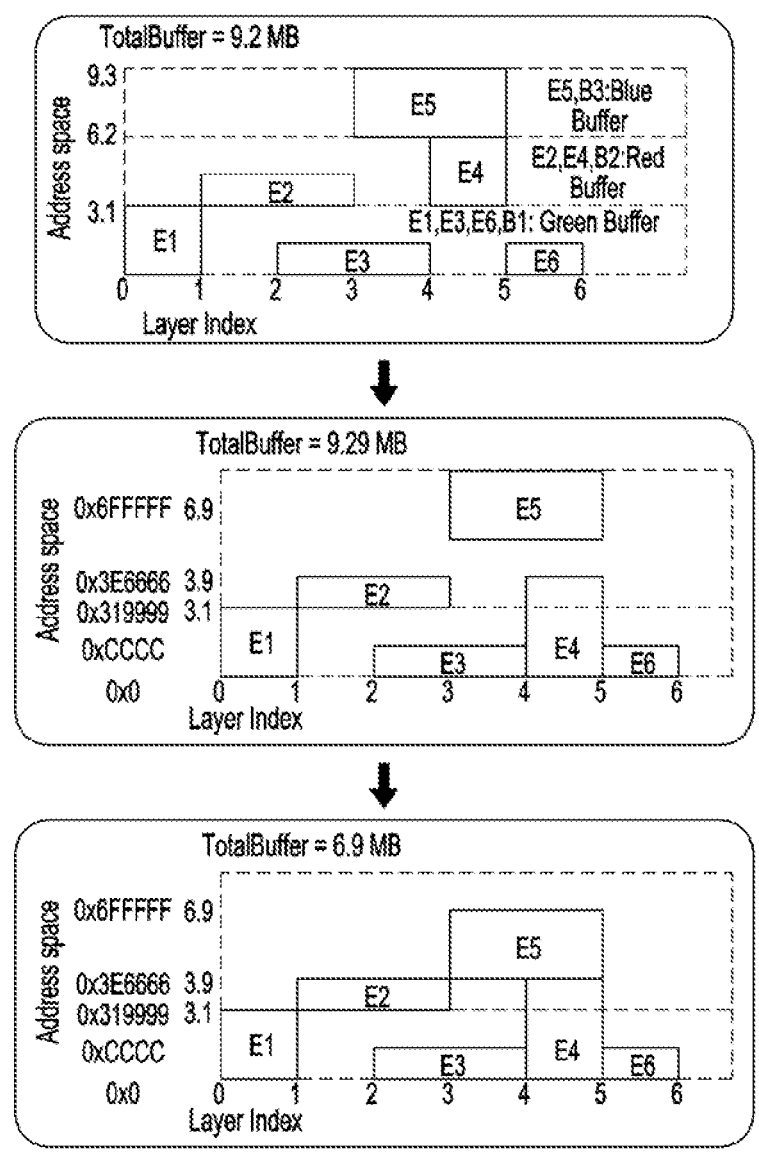
FIG. 11b is an example diagram illustrating allocation of the memory buffer after determining the reuse of memory buffers and the reuse buffer overlap possibilities, according to embodiments of the present disclosure.

FIG. 11b is an example diagram illustrating allocation of the memory buffer after determining the reuse of memory buffers and the reuse buffer overlap possibilities, according to embodiments of the present disclosure. Embodiments herein enable the buffer overlap exploration unit 604 determines the reuse of the memory buffers and generates the 2D plane layout. The memory buffers B1 of green color, B2 of red color and B3 of blue color can be realized on the 2D plane layout by representing the address space on the X-axis and the layer index on the Y-axis. Further, the size of the total memory required for processing the DNN model after determining the reuse of the memory buffers B1 and B2 can be 9.29 MB.

Based on the explored overlap possibilities between the rectangular boxes of different colors, the buffer overlap exploration unit 604 squeezes/compresses the rectangular box E4 (corresponding to the memory buffer B2 of red color assigned to the edge E4) in between the rectangular box E3 (corresponding to the memory buffer B1 of green color assigned to the edge E3) and the rectangular box E5 (corresponding to the memory buffer B1 of green color assigned to the edge E5). After pushing the rectangular box E4, the address space of the rectangular box E4 corresponding to the memory buffer B2 of red color overlaps with the address space of the rectangular box E1 of green color assigned to the edge E1. However, the address space overlap does not conflict with the corresponding layer dependencies and other memory buffers.

After squeezing the rectangular box E4, the rectangular box E5 corresponding to the memory buffer B3 of blue color assigned to the edge E5 can be pushed down on the Y-axis. After squeezing the rectangular box E5, the total memory size required for processing the DNN model can be equal to 6.1 MB. Thus, squeezing of one or more rectangular boxes corresponding to the memory buffers of one or more colors can further reduces the total memory requirement for processing the DNN model by 25%.

Figure 11C:
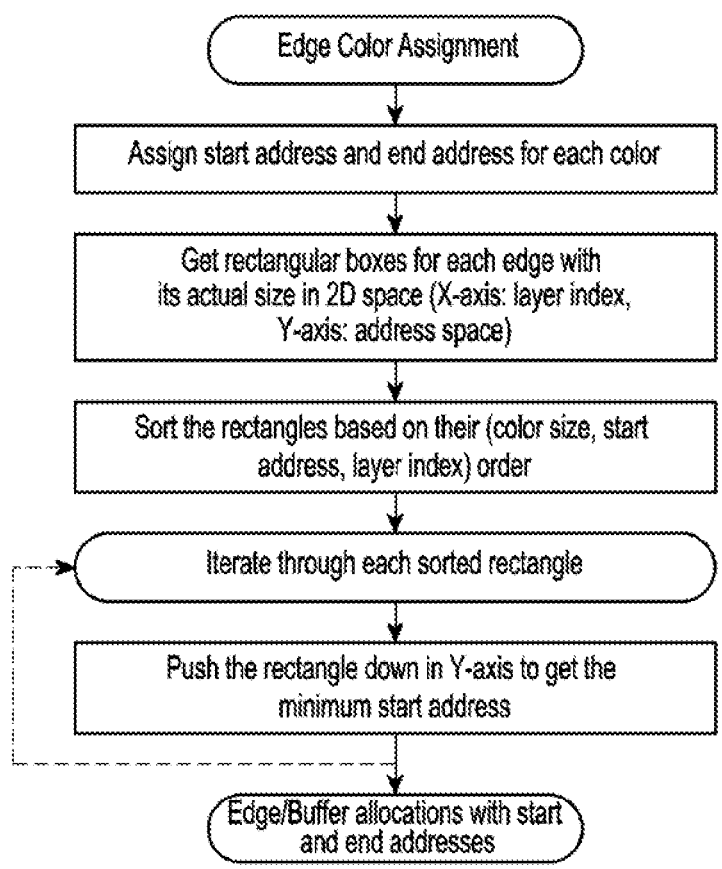
FIG. 11c is an example flow diagram illustrating a method for identifying reuse buffer overlap possibilities across processing layers of a DNN model, according to embodiments of the present disclosure.

FIG. 11c is an example flow diagram illustrating a method for identifying the reuse buffer overlap possibilities across the processing layers of the DNN model, according to embodiments of the present disclosure. As illustrated in FIG. 11c, the buffer overlap exploration unit 604 receives the colored network graph from the graph coloring unit 602 and determines the size of each memory buffer after identifying the reuse of the at least one memory buffer of the plurality of memory buffers. Based on the maximum size of each memory buffer, the buffer overlap exploration unit 604 assigns the start and end relocatable (virtual) addresses for the memory buffers of each color. Further, the buffer overlap exploration unit 604 creates the rectangular boxes for the plurality of the edges on the 2D plane layout with the layer index on the Y-axis and the address space on the X-axis. Each rectangular box of the plurality of rectangular boxes corresponds to the at least one memory buffer assigned to each edge. The start address of each rectangular box can be equal to the start address of the corresponding memory buffer. The end address of each rectangular box can be assigned based on the memory size required for each edge.

Further, the buffer overlap exploration unit 604 sorts the rectangular boxes based on at least one of size of the memory buffer, start address, layer index and so on. The buffer overlap exploration unit 604 iterates through each sorted rectangular box. Further, the buffer overlap exploration unit 604 pushes the at least one rectangular box of the rectangular boxes down in the Y-axis to fit in any gap identified between the at least two rectangular boxes of different color. The address of the pushed rectangular box can be adjusted with the lower address value. Thus, squeezing at least one rectangular box corresponding to the memory buffer provides a 30% of gain in reduction of the memory bandwidth after reuse of the at least one memory buffer.

Figure 12A:
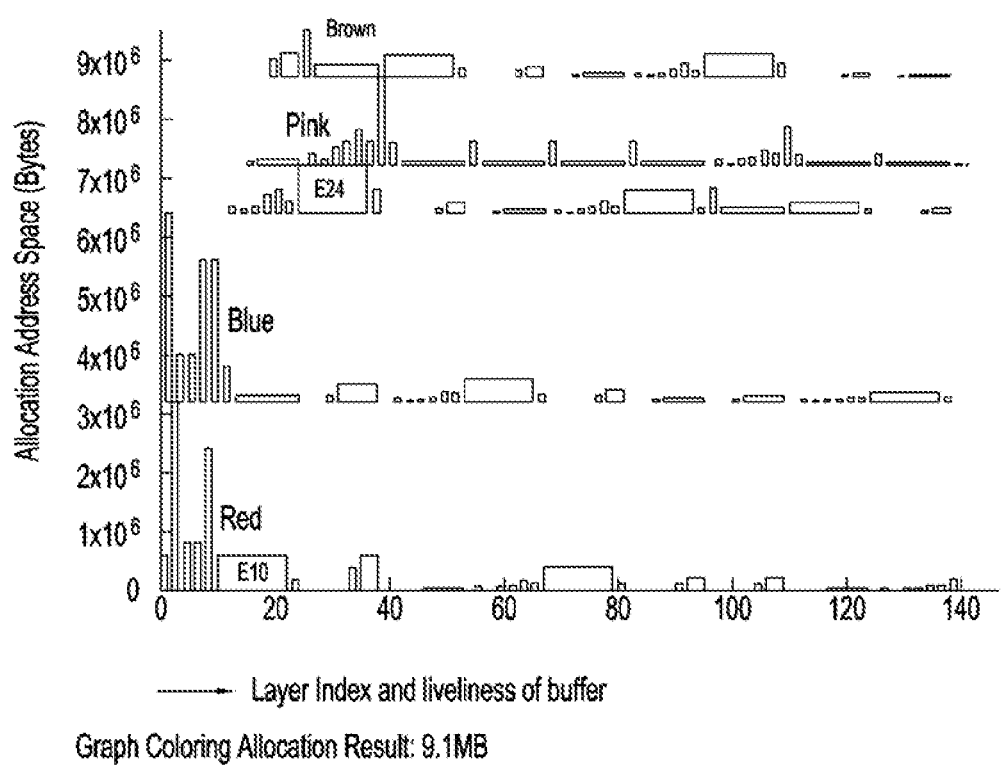
FIGS. 12a and 12b are example graphs illustrating allocation of a memory for processing a DNN model, according to embodiments of the present disclosure.
Figure 12B:
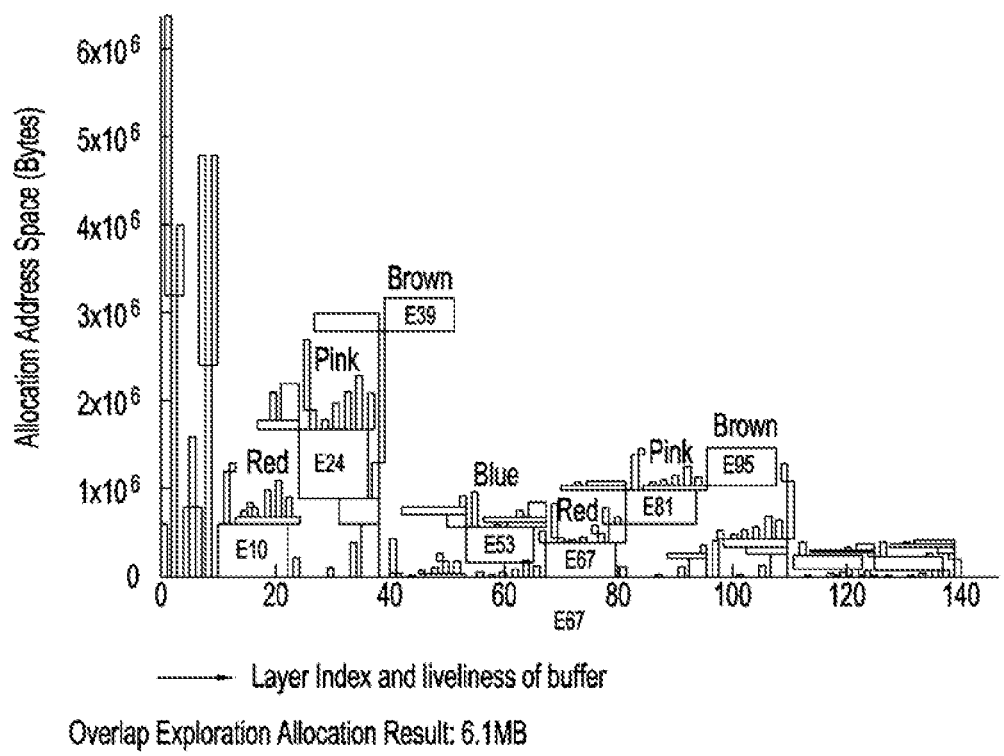

FIGS. 12a and 12b are example graphs illustrating allocation of the memory for processing the DNN model, according to embodiments of the present disclosure.

FIG. 12a is an example graph illustrating allocation of the memory for processing the DNN model based on the identified reuse of the at least one memory buffer. Embodiments herein use the colored network graph to determine the reuse of the at least one memory buffer for storing the output of at least two non-adjacent processing layers of the DNN model. Based on the determined reuse of the at least one memory buffer, the size of the memory determined for processing the DNN model can be 9.1 MB.

FIG. 12b is an example graph illustrating allocation of the memory for processing the DNN model based on identified reuse buffer overlap possibilities. Embodiments herein determine the reuse buffer overlap possibilities across the processing layers after identifying the reuse of the at least one memory buffer. The size of the memory determined for processing the DNN model after determining the reuse buffer overlap possibilities can be 6.1 MB. Thus, the memory required for processing the DNN model can be 6× less when compared to the conventional DNN inference frameworks.

Figure 13A:
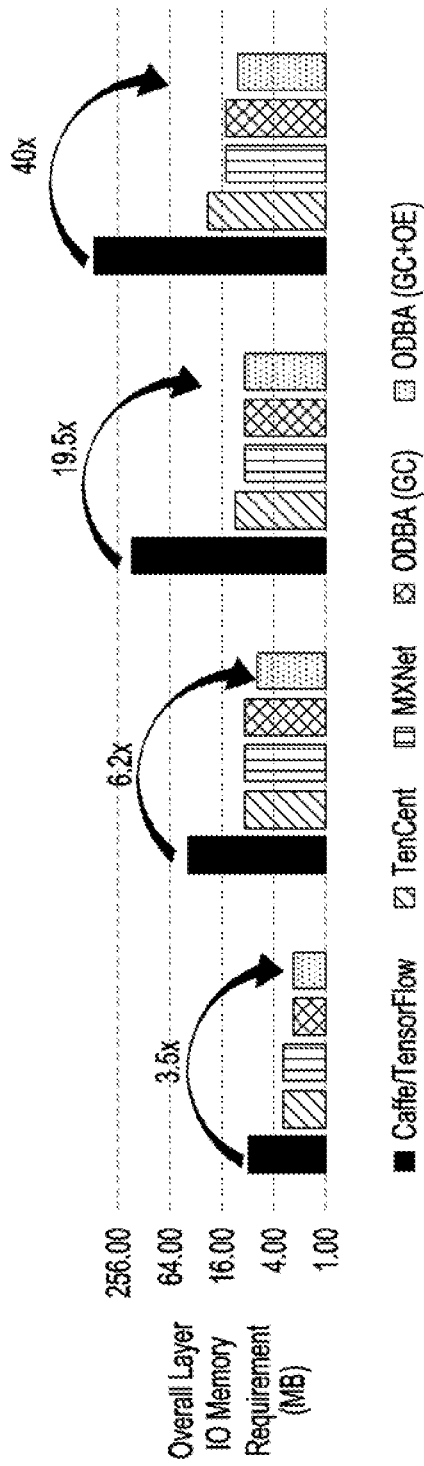
FIGS. 13a and 13b are example charts illustrating overall memory requirement for processing a DNN model on an embedded device, according to embodiments of the present disclosure.
Figure 13B:
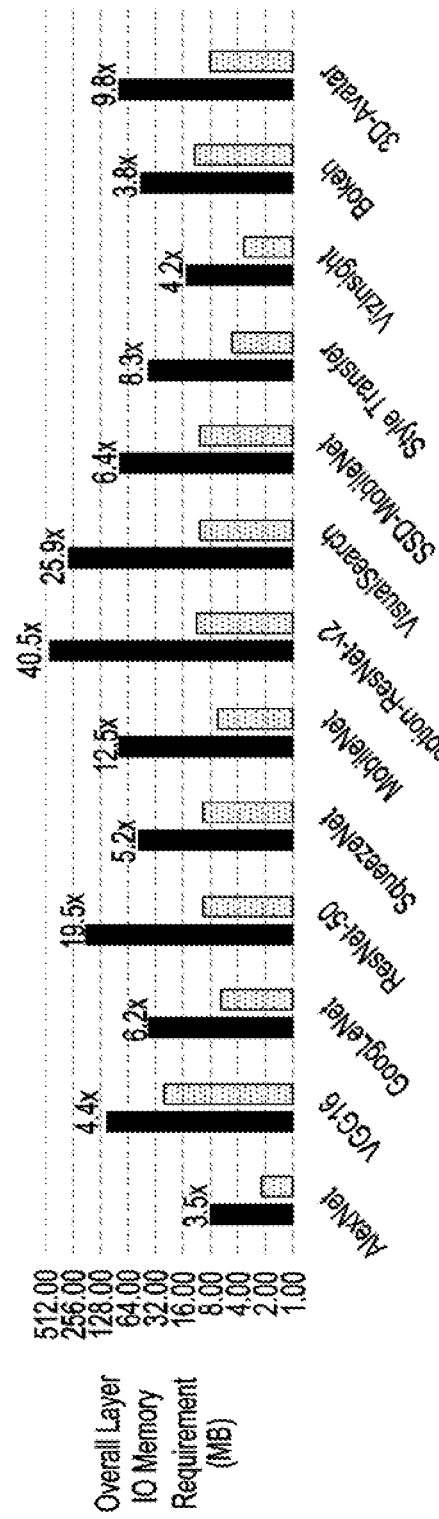

FIGS. 13a and 13b are example charts illustrating overall memory requirement for processing the DNN model on the embedded device 500, according to embodiments of the present disclosure. The overall memory calculated for processing the DNN model based on the determined reuse of the at least one memory buffer (using the graph coloring (GC)) and the buffer overlap possibilities (reuse buffer overlap exploration (OE)) can be reduced when compared with the conventional DNN inference frameworks such as Alexnet, GoogleNet, ResNet, Inception and so on (as illustrated in FIGS. 13a and 13b). For example, the overall memory requirement for processing the DNN model can be reduced by 3.5× to 26× when compared to conventional Cafee/TensorFlow. Further, the overall memory requirement for processing the DNN model can be reduced by 30% when compared to conventional MXNet/TenCent.

Figures 14A, 14B:
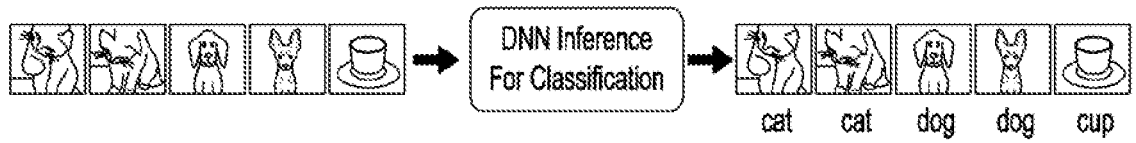
FIG. 14a is an example diagram illustrating batch processing of multiple inputs inference on an embedded device based on optimal memory buffer allocation, according to embodiments of the present disclosure.
FIG. 14b is an example table illustrating the memory requirement for performing batch processing of multiple inputs inference, according to embodiments of the present disclosure.

FIG. 14a is an example diagram illustrating batch processing of multiple inputs inference on the embedded device 500 based on the optimal memory buffer allocation, according to embodiments of the present disclosure. Embodiments herein enable the memory allocating module 512 to determine the optimal memory buffer requirement for processing the DNN model based on the determined reuse of the memory buffers and the determined reuse buffer overlap possibilities. Further, according to the optimal memory buffer requirement, the execution module 514 can perform batch processing of multiple inputs inference on the embedded device 500. Thus, the calculated optimal memory buffer requirement reduces the memory bandwidth required for batch processing.

FIG. 14b is an example table illustrating the memory requirement for performing batch processing of multiple inputs inference, according to embodiments of the present disclosure. A maximum memory buffer requirement calculated for performing the batch processing can be 247 MB. The maximum memory buffer requirement can be calculated based on the determined reuse of the memory buffers and determined reuse buffer overlap possibilities.

Figures 15A, 15B:
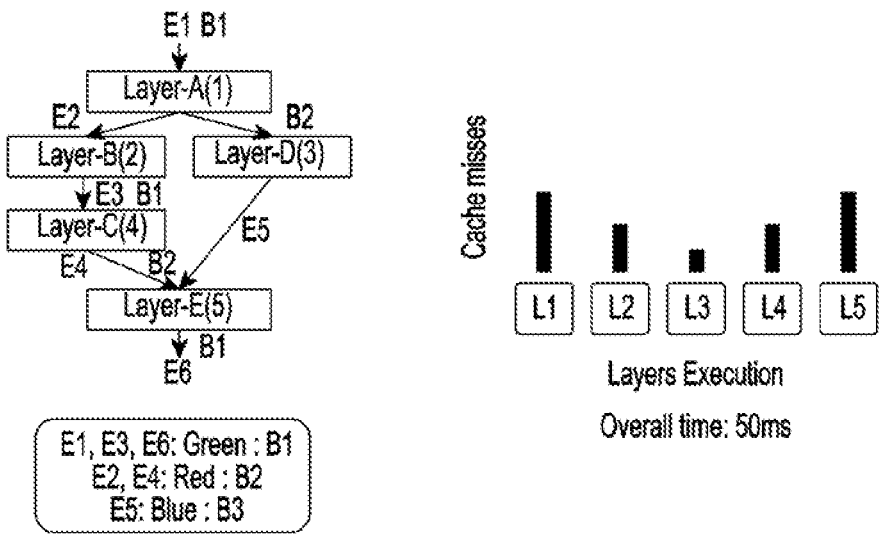
FIGS. 15a and 15b are example diagrams illustrating DNN inference performance based on an optimal memory buffer allocation for an inference phase, according to embodiments of the present disclosure.

FIGS. 15a and 15b are example diagrams illustrating DNN inference performance based on the optimal memory buffer allocation for the inference phase, according to embodiments of the present disclosure. Embodiments herein enable the memory allocating module 512 to reuse the at least one memory buffer for storing the output of the at least two processing layers of the DNN model. Further, when the layer writes the feature map output, the feature map output resides in Level-2/Level-3 cache because of the reuse of the at least one memory buffer. Thus, cache miss can be avoided which further reduces the overall execution time and increases the DNN inference performance. In an embodiment, the overall execution time can be 50 ms. The increased DNN inference performance because of reuse of the at least one buffer is illustrated in FIG. 15b.

Figure 16A:
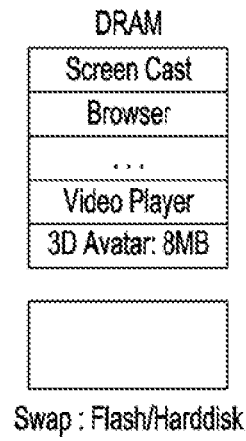
FIGS. 16a and 16b are example diagrams illustrating launching of DNN related applications on an embedded device based on an optimal memory allocation, according to embodiments of the present disclosure.
Figure 16B:
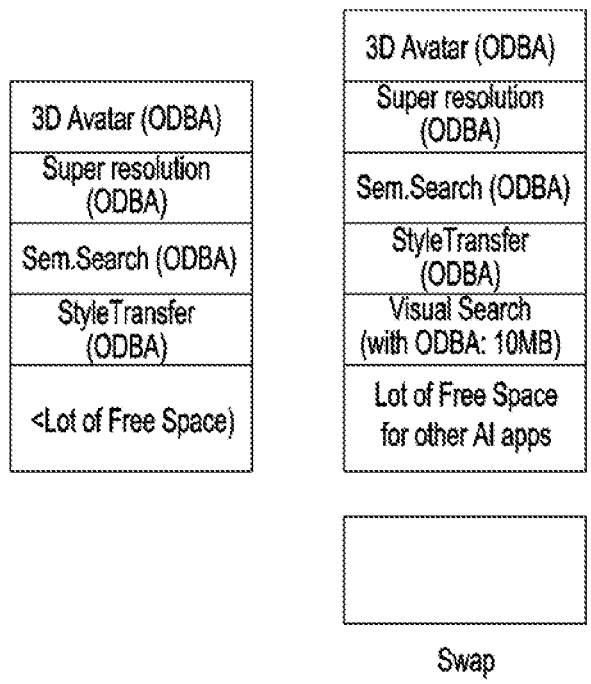

FIGS. 16a and 16b are example diagrams illustrating launching of DNN related applications on the embedded device 500 based on the optimal memory buffer allocation, according to embodiments of the present disclosure. Embodiments herein reduce the overall memory requirement for processing the DNN model based on the determined reuse of the memory buffers and determined reuse buffer overlap possibilities. Thus, the reduced overall memory requirement makes the memory available for any new DNN related applications. As illustrated in FIG. 16a, when a 3D Avatar application (a new DNN related application) requests for a memory, the memory allocating module 514 can directly allocate the memory for the DNN related application instead of making the memory available by swapping. Thus, launching of the new DNN related applications can be faster and performance of existing applications does not get affected. In an embodiment, the time taken for launching of the 3D Avatar can be 3 seconds and the performance of the exiting application such as video player remains same (30 fps).

Embodiments herein enable a quick launch of the DNN related applications immediately after restart of the embedded device 500. As illustrated in FIG. 16b, as the DNN related applications require less memory bandwidth, the DNN related applications can be fit in a Random Access Memory (RAM) and more free space can be available for future applications. Thus, the DNN related applications can be launched without involving any wait time. In an embodiment, the time taken for launching the DNN related applications immediately after restart of the embedded device can be 200 ms.

The embodiments disclosed herein can be implemented through at least one software program running on at least one hardware device and performing network management functions to control the elements. The elements shown in FIG. 5 and FIG. 6 can be at least one of a hardware device, or a combination of hardware device and software module.

The embodiments disclosed herein describe methods and systems for determining memory requirement for processing the DNN model on an embedded device. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device can also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention can be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, the present disclosure has been shown and described with reference to various embodiments thereof, it will be understood by those skilled in the art that various changes in form and details may be made therein without departing from the spirit and scope of the present disclosure and defined by the appended claims and their equivalents.

The invention claimed is:

1. A device comprising:
a memory; and
at least one processor communicatively coupled to the memory, wherein the at least one processor is configured to:
receive at least one deep neural network (DNN) model for an input, wherein the at least one DNN model includes a plurality of processing layers,
generate a colored network graph of the at least one DNN model, wherein the colored network graph includes a plurality of nodes indicating the plurality of processing layers of the DNN model and a plurality of edges indicating flow of data between the plurality of processing layers, and a plurality of colors are assigned to the plurality of edges based on at least one execution order of the plurality of processing layers such that a different color is assigned to each of adjacent edges of the plurality of edges,
determine at least one reuse buffer overlap possibility across the plurality of processing layers using the colored network graph, and
determine a memory requirement for processing the at least one DNN model based on the determined at least one reuse buffer overlap possibility.

2. The device of claim 1, wherein the at least one processor is further configured to:
select at least one color from a table in response to determining a requirement of at least one memory buffer for at least one processing layer, wherein the table includes a plurality of memory buffers and the selected at least one color; and assign the at least one selected color to at least one edge of the plurality of edges associated with the at least one processing layer of the plurality of processing layers, wherein the assignment of the at least one color to the at least one edge indicates assignment of the at least one memory buffer of the plurality of memory buffers to the at least one edge associated with the at least one processing layer, and wherein the at least one color is assigned to the at least one edge based on the identified at least one execution order of the plurality of processing layers and liveliness of the at least one edge of the plurality of edges.

3. The device of claim 1, wherein the at least one processor is configured to:

identify a reuse of at least one memory buffer of at least one color for at least two edges of the colored network graph, wherein the reuse of the at least one memory buffer is identified using the colored network graph;

determine a size of the at least one memory buffer of the at least one color in response to determining the reuse of the at least one memory buffer of the at least one color for the at least two edges of the colored network graph, wherein the determined size of the at least one memory buffer is a maximum memory requirement of the at least two edges of the colored network graph;

assign non-overlapping virtual start and end addresses for the at least one memory buffer of the at least one color;

generate a two-dimensional (2D) plane layout to determine usage of the at least one memory buffer after determining the reuse of the at least one memory buffer of the at least one color, wherein the 2D plane layout includes a plurality of rectangular boxes for a plurality of edges of the colored network graph of the DNN model; and determine the at least one reuse buffer overlap possibility across the plurality of processing layers using the 2D plane layout based on allocation of the at least one memory buffer of the at least one color to the at least two edges of the colored network graph.

4. The device of claim 3, wherein at least one rectangular box of the plurality of rectangular boxes present in the 2D plane layout corresponds to the at least one memory buffer of the at least one color.

5. The device of claim 4, wherein the at least one rectangular box of the plurality of rectangular boxes is assigned with the at least one color of the at least one memory buffer.

6. The device of claim 5, wherein a height of the at least one rectangular box indicates the size of the at least one memory buffer of the at least one color and a width of the at least one rectangular box indicates a liveliness of the at least one memory buffer across the plurality of processing layers.

7. The device of claim 3, wherein the at least one processor is configured to:

sort at least one rectangular box of the plurality of rectangular boxes corresponding to the at least one memory buffer of the at least one color based on at least one of the size of the at least one memory buffer of the at least one color, a start address of at least one rectangular box corresponding to the at least one memory buffer and a layer index;

determine at least one overlap possibility across the plurality of rectangular boxes of at least one different color with respect to at least one of at least one liveliness constraint associated with the at least one memory buffer and at least one dependency constraint associated with the plurality of processing layers to determine the at least one reuse buffer overlap possibility;

squeeze the at least one rectangular box corresponding to the at least one memory buffer of the at least one color on the 2D plane layout in response to determining zero overlap possibility across the plurality of rectangular boxes of the at least one different color; and assign a lower value address to the at least one squeezed rectangular box, wherein assigning the lower value address to the at least one squeezed rectangular box indicates assignment of a new start address and a new end address for the at least one memory buffer of the at least one color corresponding to the at least one squeezed rectangular box.

8. The device of claim 1, wherein the at least one processor is further configured to:

allocate the determined memory requirement for processing the DNN model by assigning a relative address space for at least one memory buffer of at least one color, wherein the relative address space is assigned to the at least one memory buffer based on a start address of at least one rectangular box of a two-dimensional (2D) plane layout corresponding to the at least one memory buffer, wherein the 2D plane layout includes at least one squeezed rectangular box.

9. A method for determining a memory requirement for processing a deep neural network (DNN) model on a device, the method comprising:

receiving at least one DNN model for an input, wherein the at least one DNN model includes a plurality of processing layers;

generating a colored network graph of the at least one DNN model, wherein the colored network graph includes a plurality of nodes indicating the plurality of processing layers of the DNN model and a plurality of edges indicating flows of data between the plurality of processing layers, and a plurality of colors are assigned to the plurality of edges based on at least one execution order of the plurality of processing layers such that a different color is assigned to each of adjacent edges of the plurality of edges;

determining at least one reuse buffer overlap possibility across the plurality of processing layers using the colored network graph; and determining the memory requirement for processing the at least one DNN model based on the determined at least one reuse buffer overlap possibility.

10. The method of claim 9, wherein generating the colored network graph of the at least one DNN model includes:

selecting at least one color from a table in response to determining a requirement of at least one memory buffer for at least one processing layer, wherein the table includes a plurality of memory buffers and the selected at least one color; and assigning the at least one selected color to at least one edge of the plurality of edges associated with the at least one processing layer of the plurality of processing layers, wherein the assignment of the at least one color to the at least one edge indicates assignment of the at least one memory buffer of the plurality of memory buffers to the at least one edge associated with the at least one processing layer, and wherein the at least one color is assigned to the at least one edge based on the identified at least one execution order of the plurality of processing layers and a liveliness of the at least one edge of the plurality of edges.

11. The method of claim 9, wherein determining the at least one reuse buffer overlap possibility includes:
identifying a reuse of at least one memory buffer of at least one color for at least two edges of the colored network graph, wherein the reuse of the at least one memory buffer is identified using the colored network graph;
determining a size of the at least one memory buffer of the at least one color in response to determining the reuse of the at least one memory buffer of the at least one color for the at least two edges of the colored network graph, wherein the determined size of the at least one memory buffer is a maximum memory requirement of the at least two edges of the colored network graph;
assigning non-overlapping virtual start and end addresses for the at least one memory buffer of the at least one color;
generating a two-dimensional (2D) plane layout to determine usage of the at least one memory buffer after determining the reuse of the at least one memory buffer of the at least one color, wherein the 2D plane layout includes a plurality of rectangular boxes for a plurality of edges of the colored network graph of the DNN model; and
determining the at least one reuse buffer overlap possibility across the plurality of processing layers using the 2D plane layout based on allocation of the at least one memory buffer of the at least one color to the at least two edges of the colored network graph.

12. The method of claim 11, wherein at least one rectangular box of the plurality of rectangular boxes present in the 2D plane layout corresponds to the at least one memory buffer of the at least one color.

13. The method of claim 12, wherein the at least one rectangular box of the plurality of rectangular boxes is assigned with the at least one color of the at least one memory buffer.

14. The method of claim 13, wherein a height of the at least one rectangular box indicates the size of the at least one memory buffer of the at least one color and a width of the at least one rectangular box indicates a liveliness of the at least one memory buffer across the plurality of processing layers.

15. The method of claim 11, wherein determining the at least one reuse buffer overlap possibility includes:
sorting at least one rectangular box of the plurality of rectangular boxes corresponding to the at least one memory buffer of the at least one color based on at least one of the size of the at least one memory buffer of the at least one color, a start address of at least one rectangular box corresponding to the at least one memory buffer, and a layer index;
determining at least one overlap possibility across the plurality of rectangular boxes of at least one different color with respect to at least one of at least one liveliness constraint associated with the at least one memory buffer and at least one dependency constraint associated with the plurality of processing layers to determine the at least one reuse buffer overlap possibility;
squeezing the at least one rectangular box corresponding to the at least one memory buffer of the at least one color on the 2D plane layout in response to determining zero overlap possibility across the plurality of rectangular boxes of the at least one different color; and
assigning a lower value address to the at least one squeezed rectangular box,
wherein assigning the lower value address to the at least one squeezed rectangular box indicates assignment of a new start address and a new end address for the at least one memory buffer of the at least one color corresponding to the at least one squeezed rectangular box.

16. The method of claim 9, further comprising allocating the determined memory requirement for processing the DNN model by assigning a relative address space for at least one memory buffer of at least one color,
wherein the relative address space is assigned to the at least one memory buffer based on a start address of at least one rectangular box of a two-dimensional (2D) plane layout corresponding to the at least one memory buffer, and
wherein the 2D plane layout includes at least one squeezed rectangular box.

* * * * *